United States Patent
Toba et al.

(10) Patent No.: US 8,750,536 B2
(45) Date of Patent: Jun. 10, 2014

(54) OUTPUT CONTROL APPARATUS, OUTPUT CONTROLLING METHOD, PROGRAM, AND OUTPUT CONTROL SYSTEM

(75) Inventors: Kazuaki Toba, Kanagawa (JP); Gen Ichimura, Tokyo (JP)

(73) Assignee: Sony Corporation (JP)

( * ) Notice: Subject to any disclaimer, the term of this patent is extended or adjusted under 35 U.S.C. 154(b) by 673 days.

(21) Appl. No.: 12/928,056

(22) Filed: Dec. 2, 2010

(65) Prior Publication Data

US 2011/0142245 A1    Jun. 16, 2011

(30) Foreign Application Priority Data

Dec. 14, 2009    (JP) ................ P2009-282952

(51) Int. Cl.
*H04B 3/00* (2006.01)
*H04R 1/02* (2006.01)
*H04R 9/06* (2006.01)

(52) U.S. Cl.
USPC ............ 381/80; 381/77; 381/81; 381/333

(58) Field of Classification Search
USPC ............... 381/22, 77, 80, 81, 333
See application file for complete search history.

(56) References Cited

U.S. PATENT DOCUMENTS

| 8,175,298 B2 * | 5/2012 | Mitani et al. ............ 381/123 |
| 2008/0063216 A1 * | 3/2008 | Sakata et al. ............ 381/80 |
| 2009/0051825 A1 | 2/2009 | Asayama et al. |
| 2009/0141170 A1 | 6/2009 | Asayama et al. |

FOREIGN PATENT DOCUMENTS

JP    2007-104138 A    4/2007

* cited by examiner

Primary Examiner — Vivian Chin
Assistant Examiner — Douglas Suthers
(74) Attorney, Agent, or Firm — Lerner, David, Littenberg, Krumholz & Mentlik, LLP

(57) ABSTRACT

Provided is an output control apparatus connected to an audio output apparatus controlling output of audio data, including: a receiving unit configured to receive encoded data obtained by encoding multi-channel audio data; a decoding unit configured to decode the encoded data; an output control unit configured to control output of a predetermined number of channels of audio data among the multi-channel audio data obtained by the decoding; a transmitting unit configured to transmit any one of audio data different from the audio data of which the output is controlled by the output control unit among the multi-channel audio data obtained by the decoding and the encoded data to an audio output apparatus connected through an integrated cable formed by integrating at least a video line, an audio line, and a control line; and a control unit configured to control the audio output apparatus through the integrated cable.

12 Claims, 17 Drawing Sheets

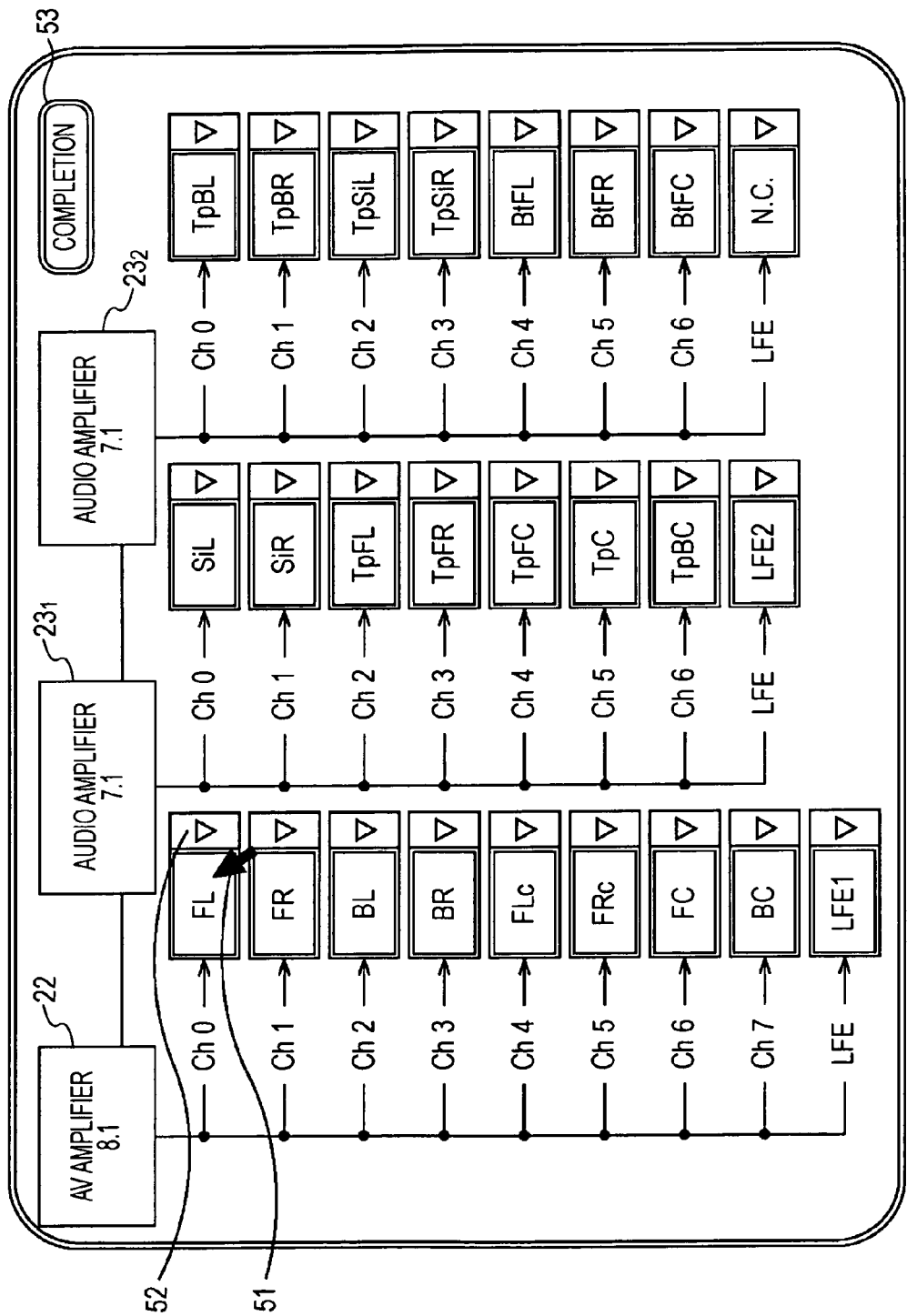

FIG. 4

<Slave Audio Channel mapping>
[Ch0 Range] (<= FullRange), [Ch0 speaker alloc] (<= SiL (=10))
[Ch1 Range] (<= FullRange), [Ch1 speaker alloc] (<= SiR (=11))
[Ch2 Range] (<= FullRange), [Ch2 speaker alloc] (<= TpFL(=12))
[Ch3 Range] (<= FullRange), [Ch3 speaker alloc] (<= TpFR(=13))
[Ch4 Range] (<= FullRange), [Ch4 speaker alloc] (<= TpFC(=14))
[Ch5 Range] (<= FullRange), [Ch5 speaker alloc] (<= TpC (=15))
[Ch6 Range] (<= FullRange), [Ch6 speaker alloc] (<= TpBC(=16))
[Ch7 Range] (<= LFE),       [Ch7 speaker alloc] (<= LFE2(=17))

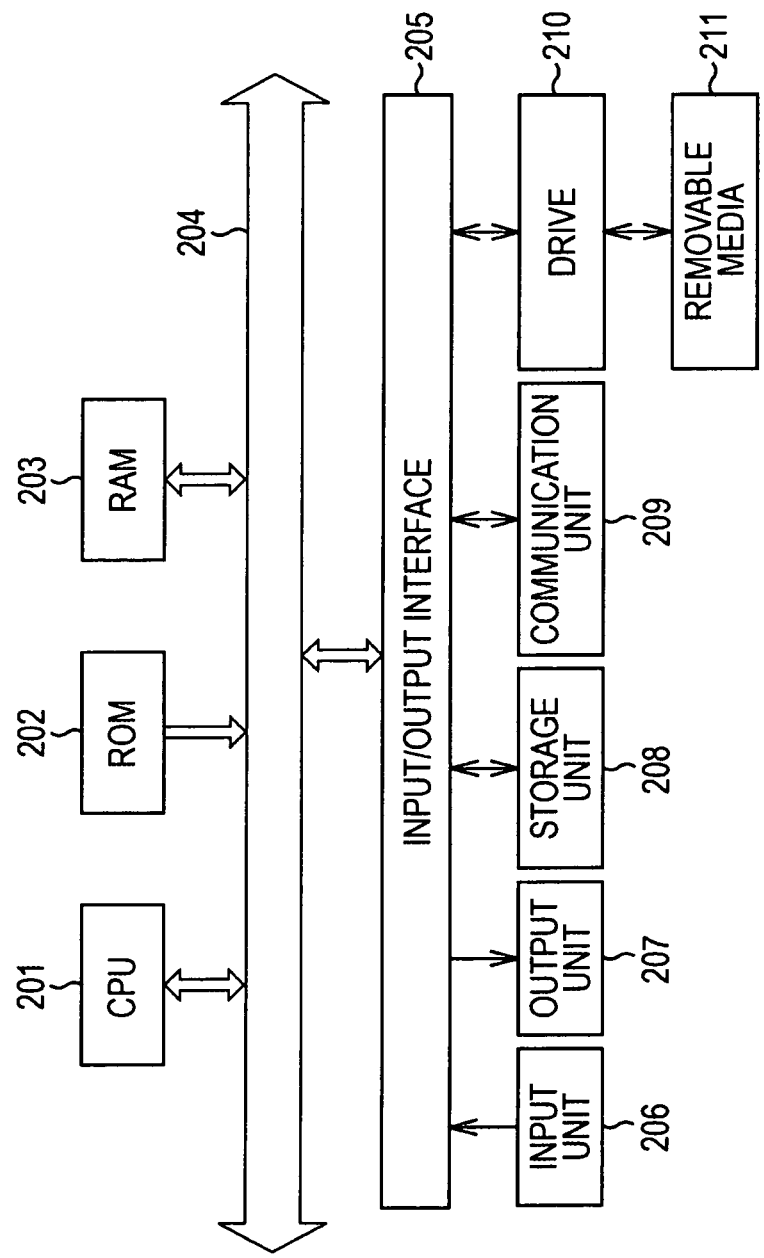

OUTPUT CONTROL APPARATUS, OUTPUT CONTROLLING METHOD, PROGRAM, AND OUTPUT CONTROL SYSTEM

CROSS-REFERENCE TO RELATED APPLICATION

The present application claims priority from Japanese Patent Application No. JP 2009-282952 filed in the Japanese Patent Office on Dec. 14, 2009, the entire content of which is incorporated herein by reference.

BACKGROUND OF THE INVENTION

1. Field of the Invention

The present invention relates to an output control apparatus, an output controlling method, a program, and an output control system, and more particularly, to an ,output control apparatus, an output controlling method, a program, and an output control system capable of outputting, for example, multi-channel audio data, of which the number of channels are larger than the number of channels that correspond to one output control apparatus, by cooperating a plurality of output control apparatuses outputting the multi-channel audio data from speakers.

2. Description of the Related Art

In the related art, there is an HDMI (high definition multimedia interface) cable connecting, for example, a television set with an AV (audio visual) receiver or the like which outputs (reproduces) sound (for example, refer to Japanese Unexamined Patent Application Publication No. 2007-104138).

Recently, the HDMI cable is a cable manufactured according to the specification of HDMI (R) which becomes a de-facto standard as a digital interface standard used for transmission of high-quality digital AV contents.

In addition, recently, for example, in BS (broadcasting satellite) digital broadcasting, the broadcasting (transmission) of encoded 22.2-channel (24-channel) audio data is considered.

Current available HDMI cables may be able to be used for transmitting up to a maximum of the 7.1-channel (8-channel) audio data. In the BS broadcasting or the like, if the broadcasting of the 22.2-channel (24-channel) audio data is to be performed, the decoded 22.2-channel (24-channel) audio data may not be transmitted by using the current available HDMI cables.

In addition, in the related art, there is a connection technology where 5.1-channel (6-channel) audio data output from, for example, a super audio CD multi-channel player is distributed through audio cables to three audio amplifiers in units of two channels and the three audio amplifiers are connected to each other with a dedicated control cable in order to cooperatively output the audio data.

According to the connection technology, an audio output system where the 5.1-channel (6-channel) audio data supplied from the super audio CD multi-channel player to the three audio amplifiers are cooperatively output may be constructed by connecting the three audio amplifiers with the dedicated control cable.

SUMMARY OF THE INVENTION

However, as described above, in the related art, in order to cooperatively output the 5.1-channel (6-channel) audio data, the three audio amplifiers may have to be connected to each other by using the dedicated control cables.

For this reason, as the three audio amplifiers, audio amplifiers which may be able to be connected by using dedicated control cables may have to be used, so that versatility is decreased.

It is desirable to provide one output control apparatus capable of outputting multi-channel audio data, of which the number of channels are larger than the number of channels that correspond to one output control apparatus, by cooperating a plurality of output control apparatuses outputting the multi-channel audio data, for example, by using an integrated cable having versatility is such as an HDMI cable.

According to a first embodiment of the invention, there is provided an output control apparatus connected to an audio output apparatus controlling output of audio data, including: a receiving means for receiving encoded data obtained by encoding multi-channel audio data; a decoding means for decoding the encoded data; an output control means for controlling output of a predetermined number of channels of audio data among the multi-channel audio data obtained by the decoding; a transmitting means for transmitting any one of audio data different from the audio data of which the output is controlled by the output control means among the multi-channel audio data obtained by the decoding and the encoded data to an audio output apparatus connected through an integrated cable formed by integrating at least a video line, an audio line, and a control line; and a control means for controlling the audio output apparatus through the integrated cable.

In the above embodiment, the control means may control the audio output apparatus to adjust a sound volume of a sound corresponding to the audio data output by the audio output apparatus.

In addition, the output control apparatus may further include a calculating means for calculating an offset value obtained by subtracting a strength of a sound output from the output control means from a strength of a sound output from the audio output apparatus, wherein the control means adjusts the sound volume of the sound corresponding to the audio data output by the audio output apparatus based on the offset value.

In addition, the control means may further perform controlling so that the audio data output in the output control means and the audio data output in the audio output apparatus are output at the same timing.

In addition, the output control apparatus may further include: an acquiring means for acquiring an EDID of the audio output apparatus; a storage means for storing an EDID of the output control apparatus; a generating means for generating an EDID of an output control system, which is constructed with the output control apparatus and the audio output apparatus, based on the EDID of the output control apparatus and the EDID of the audio output apparatus.

In addition, the control means may control the audio output apparatus to set audio data output from a plurality of output units included in the audio output apparatus.

In addition, the EDID may include at least one of a latency indicating a time taken from the time when the audio data are received to the time when the audio data are output, the number of channels capable of outputting the audio data, and a decodable encoding method.

In addition, the receiving means may receive the encoded data through the integrated cable.

In addition, the integrated cable may be an HDMI cable, and the control means may controls the audio output apparatus via a CEC line of the HDMI cable.

In addition, the transmitting means may transmit the encoded data via an ARC line of the HDMI cable to the audio output apparatus.

In addition, the transmitting means may transmit data different from the data of which the output is controlled by the output control means among the after-decoding multi-channel data via a TMDS channel line of the HDMI cable to the audio output apparatus.

In addition, the output control means may control a plurality of output units, which output sounds corresponding to the audio data, to output the corresponding sounds.

According to a first embodiment of the invention, there is provided an output controlling method of an output control apparatus connected to an audio output apparatus controlling output of audio data, wherein the output control apparatus includes: a receiving means; a decoding means; an output control means; a transmitting means; and a control means, and wherein the output controlling method includes the steps of: in the receiving means, receiving encoded data obtained by encoding multi-channel audio data; in the decoding means, decoding the encoded data; in the output control means, controlling output of a predetermined number of channels of audio data among the multi-channel audio data obtained by the decoding; in the transmitting means, transmitting any one of audio data different from the audio data of which the output is controlled by the output control means among the multi-channel audio data obtained by the decoding and the encoded data to an audio output apparatus connected through an integrated cable formed by integrating at least a video line, an audio line, and a control line; and in the control means, controlling the audio output apparatus through the integrated cable.

According to a first embodiment of the invention, there is provided a program for allowing a computer of an output control apparatus connected to an audio output apparatus controlling output of audio data to function as: a receiving means for receiving encoded data obtained by encoding multi-channel audio data; a decoding means for decoding the encoded data; an output control means for controlling output of a predetermined number of channels of audio data among the multi-channel audio data obtained by the decoding; a transmitting means for transmitting any one of audio data different from the audio data of which the output is controlled by the output control means among the multi-channel audio data obtained by the decoding and the encoded data to an audio output apparatus connected through an integrated cable formed by integrating at least a video line, an audio line, and a control line; and a control means for controlling the audio output apparatus through the integrated cable.

According to the first embodiment of the invention, the encoded data obtained by encoding the multi-channel audio data are received and decoded; the output of the a predetermined number of channels of audio data among the multi-channel audio data obtained by the decoding is controlled; any one of the audio data different from the audio data of which the output is controlled among the multi-channel audio data obtained by the decoding and the encoded data are transmitted to the audio output apparatus connected through the integrated cable formed by integrating at least the video line, the audio line, and the control line; and the audio output apparatus is controlled through the integrated cable.

According to a second embodiment of the invention, there is provided an output control system having a master apparatus receiving encoded data obtained by encoding multi-channel data and a slave apparatus connected to the master apparatus, wherein the master apparatus includes: a first receiving means for receiving the encoded data obtained by encoding the multi-channel audio data; a decoding means for decoding the encoded data; a first output control means for controlling output of a predetermined number of channels of audio data among the multi-channel audio data obtained by the decoding; a transmitting means for transmitting any one of audio data different from the audio data of which the output is controlled by the first output control means among the multi-channel audio data obtained by the decoding and the encoded data to the slave apparatus connected through an integrated cable formed by integrating at least a video line, an audio line, and a control line; and a control means for controlling the slave apparatus through the integrated cable, and wherein the slave apparatus includes: a second receiving means for receiving the audio data from the transmitting means; a second output control means for controlling output of the received audio data; and an executing means for executing a predetermined processes according to the control of the control means.

According to the second embodiment of the invention, by the master apparatus, the encoded data obtained by encoding the multi-channel audio data are received and decoded; the output of the predetermined number of the channels of audio data among the multi-channel audio data obtained by the decoding is controlled; any one of the audio data different from the audio data of which the output is controlled among the multi-channel audio data obtained by the decoding and the encoded data is transmitted to the slave apparatus connected through the integrated cable formed by integrating at least the video line, the audio line, and the control line; and the slave apparatus is controlled through the integrated cable. In addition, by the slave apparatus, the audio data from the master apparatus are received; the output of the received audio data is controlled; and the predetermined process is executed according to the control of the master apparatus.

According to the invention, it is possible to output multi-channel audio data, of which the number of channels is larger than the number of channels that correspond to one output control apparatus, by cooperating a plurality of output control apparatuses outputting the multi-channel audio data, for example, by using an integrated cable having versatility is such as an HDMI cable.

BRIEF DESCRIPTION OF THE DRAWINGS

FIG. 3 is a diagram illustrating an example of a speaker allocating screen.

FIG. 4 is a diagram illustrating an example of mapping information.

FIG. 17 is a block diagram illustrating an example of a configuration of a computer.

DESCRIPTION OF THE PREFERRED EMBODIMENTS

Hereinafter, embodiments (hereinafter, referred to as embodiments) for implementing the invention will be described. In addition, the description will be made in the following order.

1. Embodiment (Example of Output Control System Outputting Sound Corresponding to 22.2-Channel Audio Data)
2. Modified Example
1. Embodiment
Example of Configuration of Output Control System 1

Figure 1:
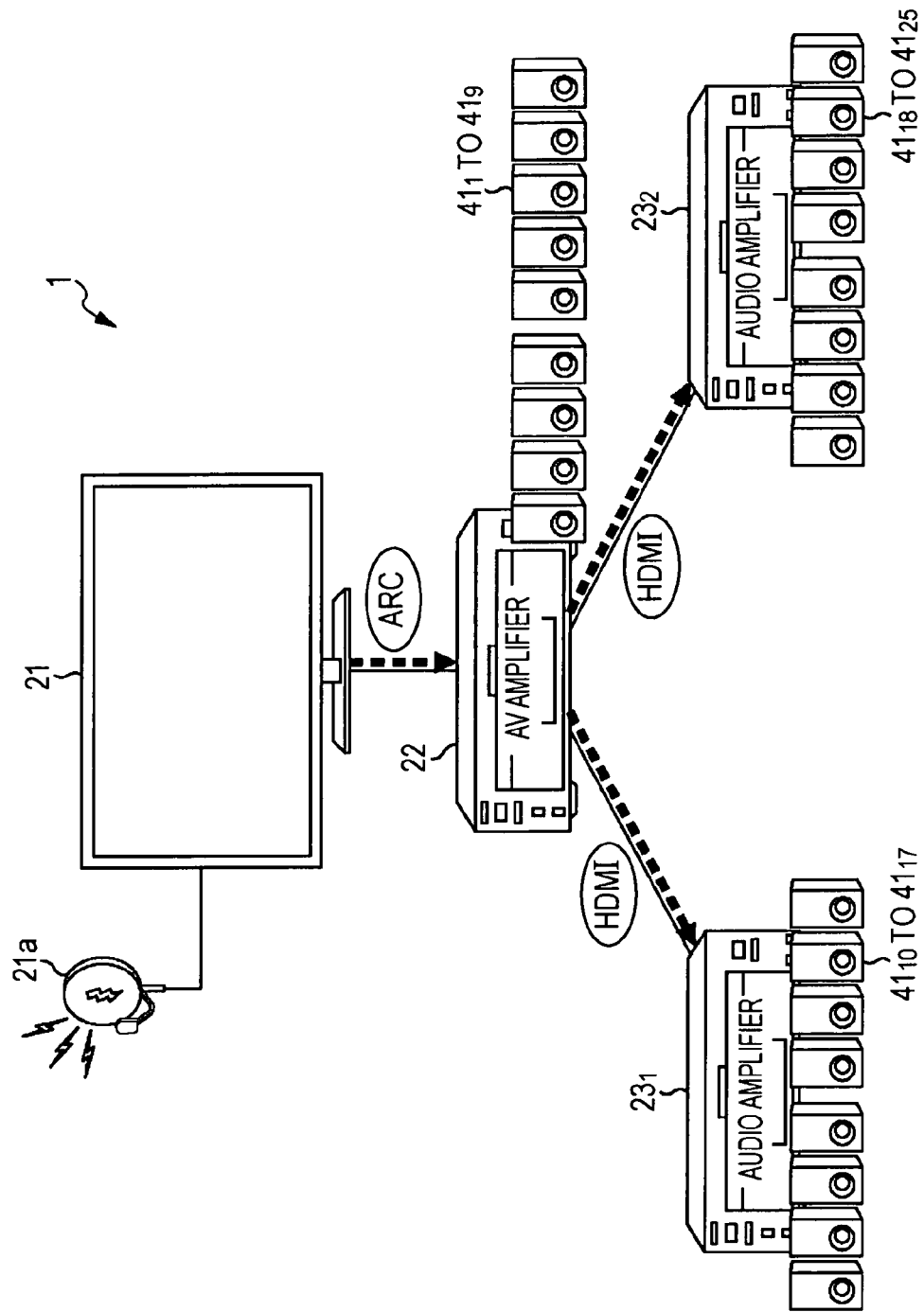
FIG. 1 is a diagram illustrating an example of a configuration of an output control system according to an embodiment of the invention.

FIG. 1 is a diagram illustrating an example of a configuration of an output control system 1 according to an embodiment of the invention.

The output control system 1 includes a television set 21 which receives a digital broadcasting signal from an antenna 21a, an AV (audio visual) amplifier 22 as a master apparatus connected with speakers $41_1$ to $41_9$, an audio amplifier $23_1$ as a slave apparatus connected with speakers $41_{10}$ to $41_{17}$, and an audio amplifier $23_2$ as a slave apparatus connected with speakers $41_{18}$ to $41_{25}$.

In addition, in the output control system 1, the AV amplifier 22 is connected to the television set 21, the audio amplifier $23_1$, and the audio amplifier $23_2$ through HDMI (high-definition multimedia interface) cables.

Herein, the HDMI cable is a cable produced based on the HDMI 1.4 standard. The HDMI cable includes, as a signal line, for example, an ARC (audio return channel) line, a TMDS (transition minimized differential signaling) channel line, a CEC (consumer electronics control) line, a DDC (display data channel) line, and the like.

In addition, the ARC line is used for communication of audio data which is encoded in the reverse direction with respect to the TMDS channel line. In addition, the TMDS channel line is used for communication of video data or audio data. In addition, the CEC line is used for bidirectional communication of a control signal (command).

In addition, the DDC line is used for communication (supplying) of EDID (extended display identification data) from an HDMI sink device (for example, the audio amplifier $23_1$ or the audio amplifier $23_2$) having an HDMI terminal, which is input with audio data or the like via the TMDS channel line, to an HDMI source device (for example, the AV amplifier 22) having an HDMI terminal, which outputs audio data or the like via the TMDS channel line.

In addition, the EDID represents information including at least one of an encoding method (encoding method for data which may be decoded in the HDMI sink device) of an encoded data (for example, encoded audio data) which the HDMI sink device may receive via the TMDS channel line, a latency indicating a time taken from the time when the audio data are received to the time when the audio data are output, the number of channels capable of outputting the audio data and the like.

In addition, the output control system 1 is disposed, for example, in a room of a house. The output control system 1 disposed in a room of a house is described later in detail with reference to FIG. 2.

The television set 21 receives a digital broadcasting signal corresponding to, for example, user's channel selection among a plurality of digital broadcasting signals received from the antenna 21a. In addition, the digital broadcasting signal may include encoded video data where video data are encoded and encoded audio data where 22.2-channel (24-channel) audio data are encoded.

The television set 21 decodes the encoded video data included in the received digital broadcasting signal and displays an image corresponding to the after-decoding video data. In addition, the television set 21 supplies the encoded audio data included in the received digital broadcasting signal via the ARC line of the HDMI cable to the AV amplifier 22.

As a master apparatus, the AV amplifier 22 decodes the encoded audio data that are supplied via the ARC line from the television set 21 and divides the 22.2-channel audio data obtained by the decoding into 8.1-channel audio data output from the speakers $41_1$ to $41_9$, 7.1-channel audio data output from the speakers $41_{10}$ to $41_{17}$, and 7-channel audio data output from the speakers $41_{18}$ to $41_{24}$.

In addition, among the speakers $41_1$ to $41_{25}$, the speakers $41_1$ to $41_{24}$ outputting the 22.2-channel audio data are set by the AV amplifier 22 and the audio amplifiers $23_1$ and $23_2$ in response to the designating manipulation by which the user designates the speaker.

Figure 7:
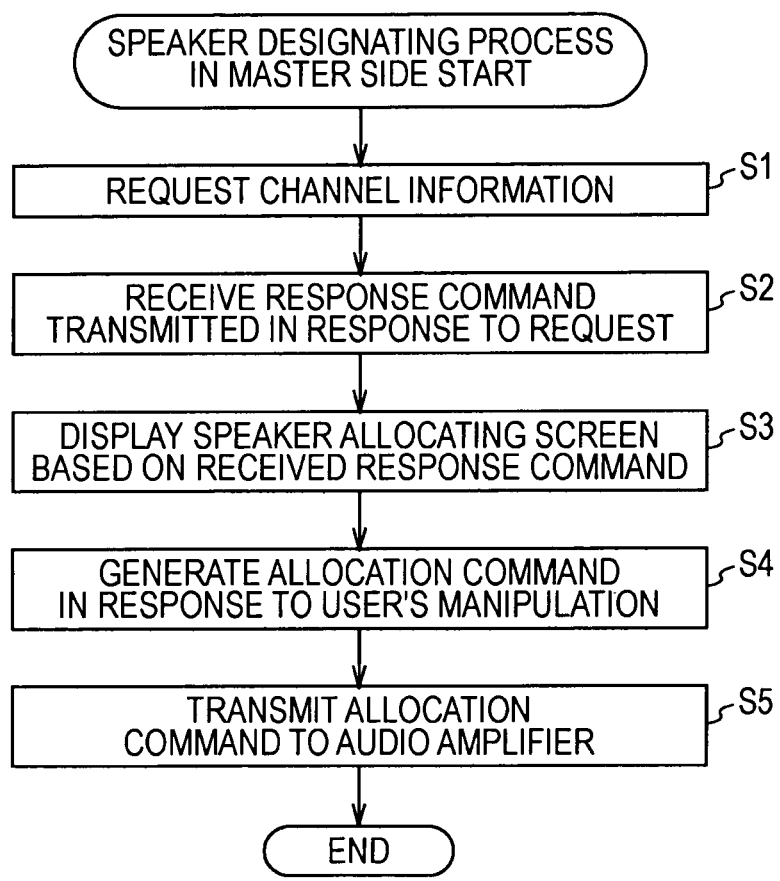
FIG. 7 is a flowchart illustrating a speaker designating process performed by an AV amplifier.
Figure 8:
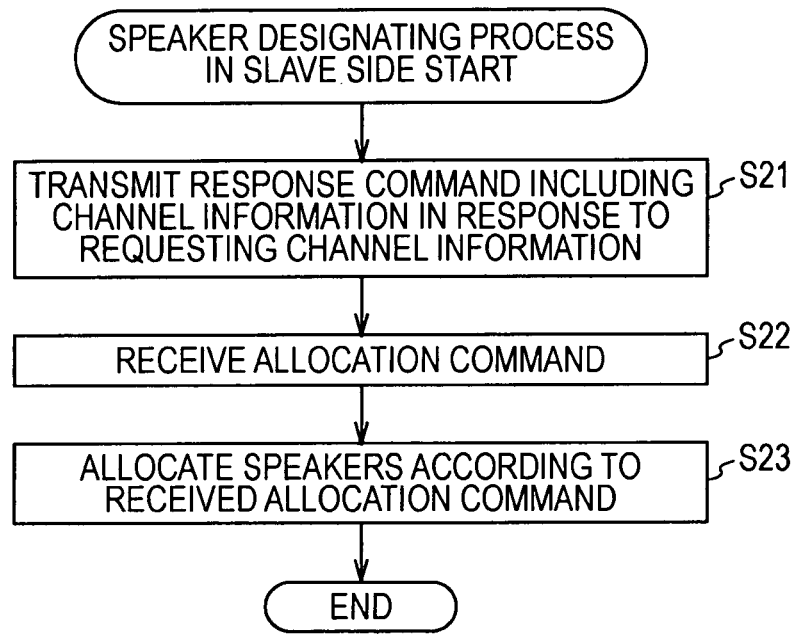
FIG. 8 is a flowchart illustrating a speaker setting process performed by an audio amplifier.

With respect to the process of setting the speaker outputting the 22.2-channel audio data, the description thereof is made later in brief with reference to FIGS. 3 and 4, and the description thereof is made later in detail with reference to flowcharts of FIGS. 7 and 8.

The AV amplifier 22 supplies the 8.1-channel audio data obtained by the division to the speakers $41_1$ to $41_9$ to output corresponding sounds.

In addition, the speakers $41_1$ to $41_9$ are configured to be supplied with audio data of which the sound volumes are corrected by an application or the like of performing a process of equalizing the sound volumes, and the speakers $41_1$ to $41_9$ are configured to output the sounds with the equal sound volumes. The aforementioned configuration is also adapted to the speakers $41_{10}$ to $41_{17}$ and the speakers $41_{18}$ to $41_{24}$.

In addition, the speakers $41_1$ to $41_9$ are configured so that the latencies of the speakers $41_1$ to $41_9$ are adjusted to the same latency by an application or the like of performing a process of equalizing the latencies. Therefore, the speakers $41_1$ to $41_9$ output sounds corresponding to the supplied audio data at the same timing.

In addition, the latencies (the same latency) of the speakers $41_1$ to $41_9$, which are adjusted by the application or the like of performing the process of equalizing the latencies, as the latency of the AV amplifier 22, are included in an EDID of the AV amplifier 22.

The aforementioned configuration is also adapted to the speakers $41_{10}$ to $41_{17}$ and the speakers $41_{18}$ to $41_{24}$.

Therefore, the speakers $41_{10}$ to $41_{17}$ output the sounds corresponding to the supplied audio data at the same timing, and the latencies of the speakers $41_{10}$ to $41_{17}$ as the latency of the audio amplifier $23_1$ are included in an EDID of the audio amplifier $23_1$.

In addition, the speakers $41_{18}$ to $41_{24}$ output the sounds corresponding to the supplied audio data at the same timing, and the latencies of the speakers $41_{18}$ to $41_{24}$ as the latency of the audio amplifier $23_2$ are included in an EDID of the audio amplifier $23_2$.

The AV amplifier 22 supplies the 7.1-channel audio data obtained by the division via the TMDS channel line of the HDMI cable to the audio amplifier $23_1$.

In addition, the AV amplifier 22 supplies the 7-channel audio data obtained by the division via the TMDS channel line of the HDMI cable to the audio amplifier $23_2$.

The AV amplifier 22 reads the EDID of the audio amplifier $23_1$ via the DDC line of the HDMI cable.

In addition, the AV amplifier 22 reads the EDID of the audio amplifier $23_2$ via the DDC line of the HDMI cable.

The AV amplifier 22 generates the EDID of the output control system 1 based on the EDID of the audio amplifier $23_1$ read from the audio amplifier $23_1$ via the DDC line of the HDMI cable, the EDID of the audio amplifier $23_2$ read from the audio amplifier $23_2$ via the DDC line of the HDMI cable, and the EDID of the AV amplifier 22 stored in the AV amplifier 22.

Figure 9:
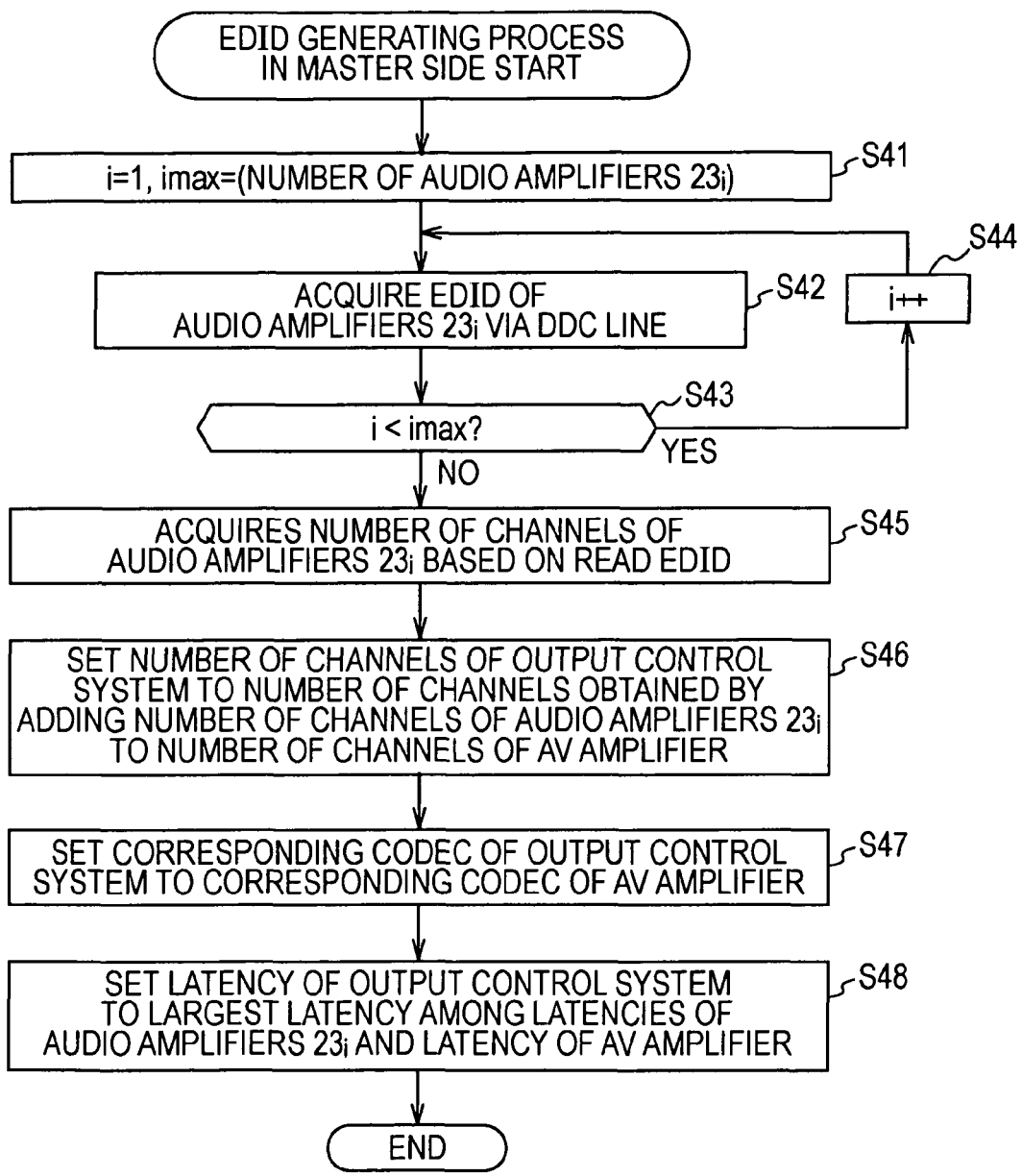
FIG. 9 is a flowchart illustrating an EDID generating process performed by an AV amplifier.

In addition, the EDID generating process where the AV amplifier 22 generates the EDID of the output control system 1 based on the EDIDs of the AV amplifier 22, the audio amplifier $23_1$, and the audio amplifier $23_2$ is described later in detail with reference to a flowchart of FIG. 9. In addition, the EDID supplying process where the audio amplifiers $23_1$ and $23_2$ supply the EDIDs thereof is described later in detail with reference to a flowchart of FIG. 10.

As a slave apparatus, the audio amplifier $23_1$ supplies the 7.1-channel (8-channel) audio data from the AV amplifier 22 to the speakers $41_{10}$ to $41_{17}$ to output corresponding sounds.

As a slave apparatus, the audio amplifier $23_2$ supplies the 7-channel audio data from the AV amplifier 22 to the speakers $41_{18}$ to $41_{24}$ to output corresponding sounds.

In addition, in the embodiment, the audio amplifier $23_2$ is configured so that sounds are output from the speakers $41_{18}$ to $41_{24}$ among the speakers $41_{18}$ to $41_{25}$ and so that no sound is output from the speaker $41_{25}$.

Figure 2:
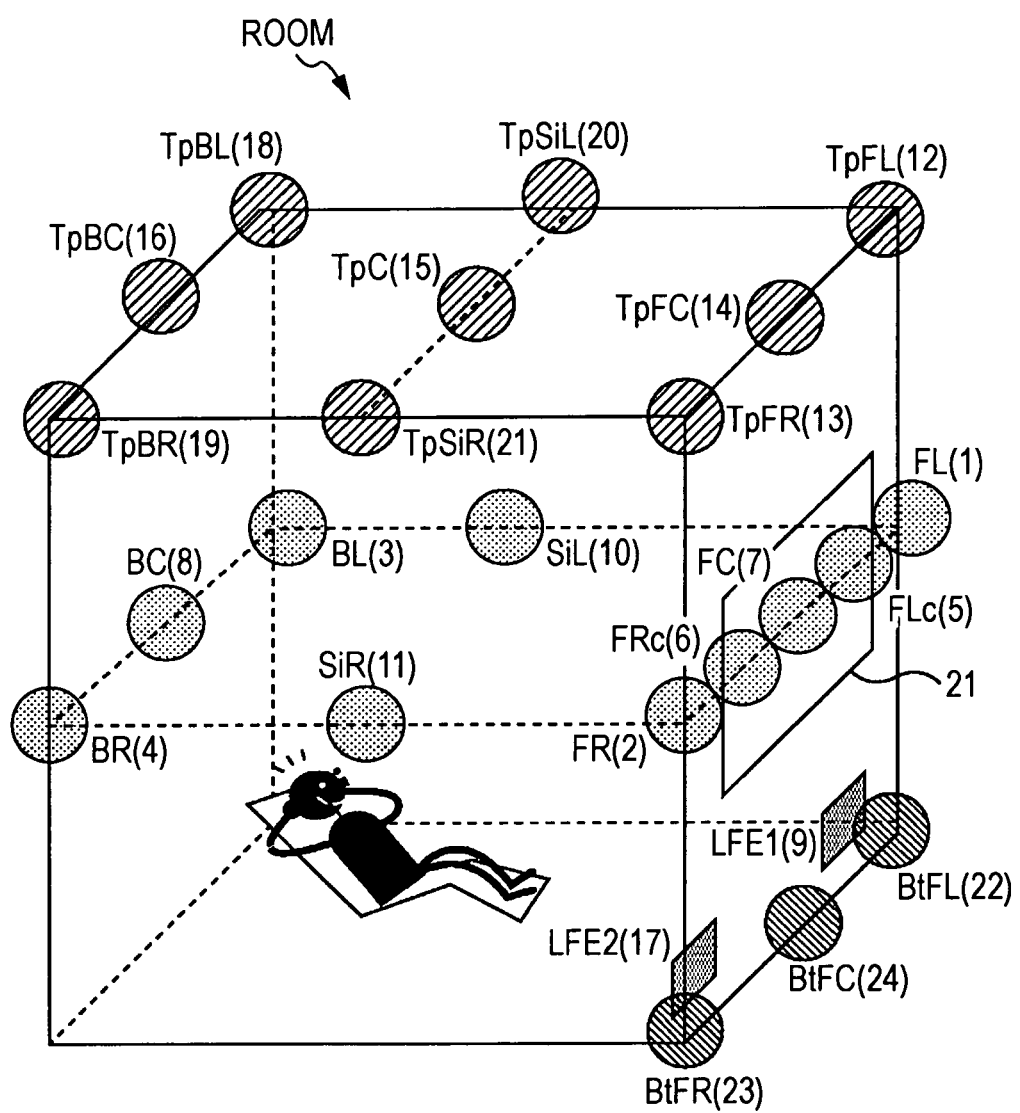
FIG. 2 is a diagram illustrating an example of an outer appearance of an output control system which is constructed in a room of a house.

Example of Outer Appearance of Output Control System 1 Constructed in Room of House Next, FIG. 2 illustrates an example of an outer appearance of the output control system 1 constructed in a room of a house.

In FIG. 2, in a room of a house, besides a screen (represented by a white rectangle) of the television set 21, speakers are disposed at positions represented by circles and rectangles. In addition, in the figure, rows of characters (alphabetic characters) appended to the circles and the rectangles represent the positions represented by the circles and the rectangles.

In addition, numbers written in parentheses adjacent to the rows of characters corresponds to the subscript numbers 1 to 24 appended to the speakers $41_1$ to $41_{24}$ so as to represent the speakers located at the positions.

Therefore, for example, the speaker $41_1$ is disposed at the position FL (1) represented by the circle.

In addition, in FIG. 2, in order to avoid complicating the figure, the AV amplifier 22, the audio amplifier $23_1$, the audio amplifier $23_2$, and the speakers $41_1$ to $41_{25}$ are omitted in the figure, but the screen of the television set 21 and the positions, at which a plurality of the speakers $41_1$ to $41_{24}$ are disposed, are illustrated.

The AV amplifier 22 performs a speaker designating process of designating the speakers $41_1$ to $41_{24}$ outputting the 22.2-channel audio data obtained by decoding the encoded audio data supplied from the television set 21.

The AV amplifier 22 controls the television set 21 to display a speaker allocating screen on the television set 21 as illustrated in FIG. 3.

Example of Speaker Allocating Screen

FIG. 3 illustrates an example of the speaker allocating screen.

As illustrated in FIG. 3, a pull-down menu image designating speakers outputting audio data corresponding to the 8.1 channels Ch0 to Ch7 and LFE (low frequency effect) output from the AV amplifier 22 is displayed in the left area of the speaker allocating screen.

In addition, a pull-down menu image designating speakers outputting audio data corresponding to the 7.1 channels Ch0 to Ch6 and LFE output from the audio amplifier $23_1$ is displayed in the central area of the speaker allocating screen.

In addition, a pull-down menu image designating speakers outputting audio data corresponding to the 7.1 channels Ch0 to Ch6 and LFE output from the audio amplifier $23_2$ is displayed in the right area of the speaker allocating screen.

For example, if the user performs a selecting manipulation by moving a cursor 51 to the area 52 and performing the selection by using a remote controller (not shown) of the television set 21 or the a manipulator (manipulator 61 of FIG. 5) of the AV amplifier 22, 24 positions (FL, FR, BL, BR, ...) illustrated in FIG. 2 which are to correspond to the 8.1 channels Ch0 to Ch7 and LFE output from the AV amplifier 22 are displayed in the pull-down menu.

If the user designates, for example, the position FL from the positions displayed in the pull-down menu, the speaker outputting the audio data corresponding to the channel Ch0 among the 8.1-channel audio data output from the AV amplifier 22 is designated as the speaker $41_1$ located at the position FL.

In this manner, after the user designates the speaker outputting the 8.1-channel audio data in the AV amplifier 22, the speaker outputting the 7.1-channel audio data in the audio amplifier $23_1$, and the speaker outputting the 7-channel audio data in the audio amplifier $23_2$, the user performs a press manipulation of pressing the completion button 53.

Accordingly, the AV amplifier 22 is set so that the audio data corresponding to the 8.1 channels Ch0 to Ch7 and the LFE are output from the designated speakers $41_1$ to $41_9$.

In addition, the AV amplifier 22 generates mapping information indicating the speakers $41_{10}$ to $41_{17}$ outputting the audio data corresponding to the 7.1 channels Ch0 to Ch6 and the LFE of the audio amplifier $23_1$ and supplies the mapping information via the CEC line to the audio amplifier $23_1$.

Therefore, the audio amplifier $23_1$ is set so that the audio data corresponding to the 7.1 channels Ch0 to Ch6 and the LFE are output from the designated speakers $41_{10}$ to $41_{17}$ based on the mapping information from the AV amplifier 22.

In addition, the AV amplifier 22 generates the mapping information indicating the speakers $41_{18}$ to $41_{24}$ outputting the audio data corresponding to the 7 channels Ch0 to Ch6 among the 7.1 channels Ch0 to Ch6 and LFE of the audio amplifier $23_2$ and indicating that the 0.1 channel LFE (LFE channel) is not connected to any one of the speakers $41_{18}$ to $41_{25}$ (any one of the speakers $41_{18}$ to $41_{25}$ does not output the audio data corresponding to the LFE channel) and supplies the mapping information via the CEC line to the audio amplifier $23_2$.

Accordingly, the audio amplifier $23_2$ is set so that the audio data corresponding to the 7 channels Ch0 to Ch6 are output from the designated speakers $41_{18}$ to $41_{24}$ based on the mapping information from the AV amplifier 22 and so that the 0.1 channel LFE is not connected to any one of the speakers $41_{18}$ to $41_{25}$ (any one of the speakers $41_{18}$ to $41_{25}$ does not output the audio data corresponding to the LFE channel).

Example of Mapping Information

FIG. 4 illustrates an example of mapping information transmitted from the AV amplifier 22 to the audio amplifier $23_1$.

The first-row data from the top of the mapping information illustrated in FIG. 4 denotes that the audio data corresponding to the channel Ch0 among the audio data corresponding to the 7.1 channels Ch0 to Ch6 and LFE output from the audio amplifier $23_1$ may be allocated to the speaker $41_{10}$ located at the position SiL (10) as a full-range speaker. In addition, the second-row data from the top denotes that the audio data corresponding to the channel Ch1 may be allocated to the speaker $41_{11}$ located at the position SiR (11) as a full-range speaker.

In addition, the third-row data from the top of the mapping information denotes that the audio data corresponding to the channel Ch2 may be allocated to the speaker $41_{12}$ located at the position TpFL (12) as a full-range speaker. In addition, the fourth-row data from the top denotes that the audio data corresponding to the channel Ch3 may be allocated to the speaker $41_{13}$ located at the position TpFR (13) as a full-range speaker.

In addition, the fifth-row data from the top of the mapping information denotes that the audio data corresponding to the channel Ch4 may be allocated to the speaker $41_{14}$ located at the position TpFC (14) as a full-range speaker. In addition, the sixth-row data from the top denotes that the audio data corresponding to the channel Ch5 may be allocated to the speaker $41_{15}$ located at the position TpC (15) as a full-range speaker.

In addition, the seventh-row data from the top of the mapping information denotes that the audio data corresponding to the channel Ch6 may be allocated to the speaker $41_{16}$ located at the position TpBC (16) as a full-range speaker. In addition, the eighth-row data from the top denotes that the audio data corresponding to the channel LFE may be allocated to the speaker $41_{17}$ located at the position LFE2 (17) as an LFE speaker.

The same mapping information is transmitted from the AV amplifier 22 to the audio amplifier $23_2$.

Example of Configuration of AV Amplifier 22

Figure 5:
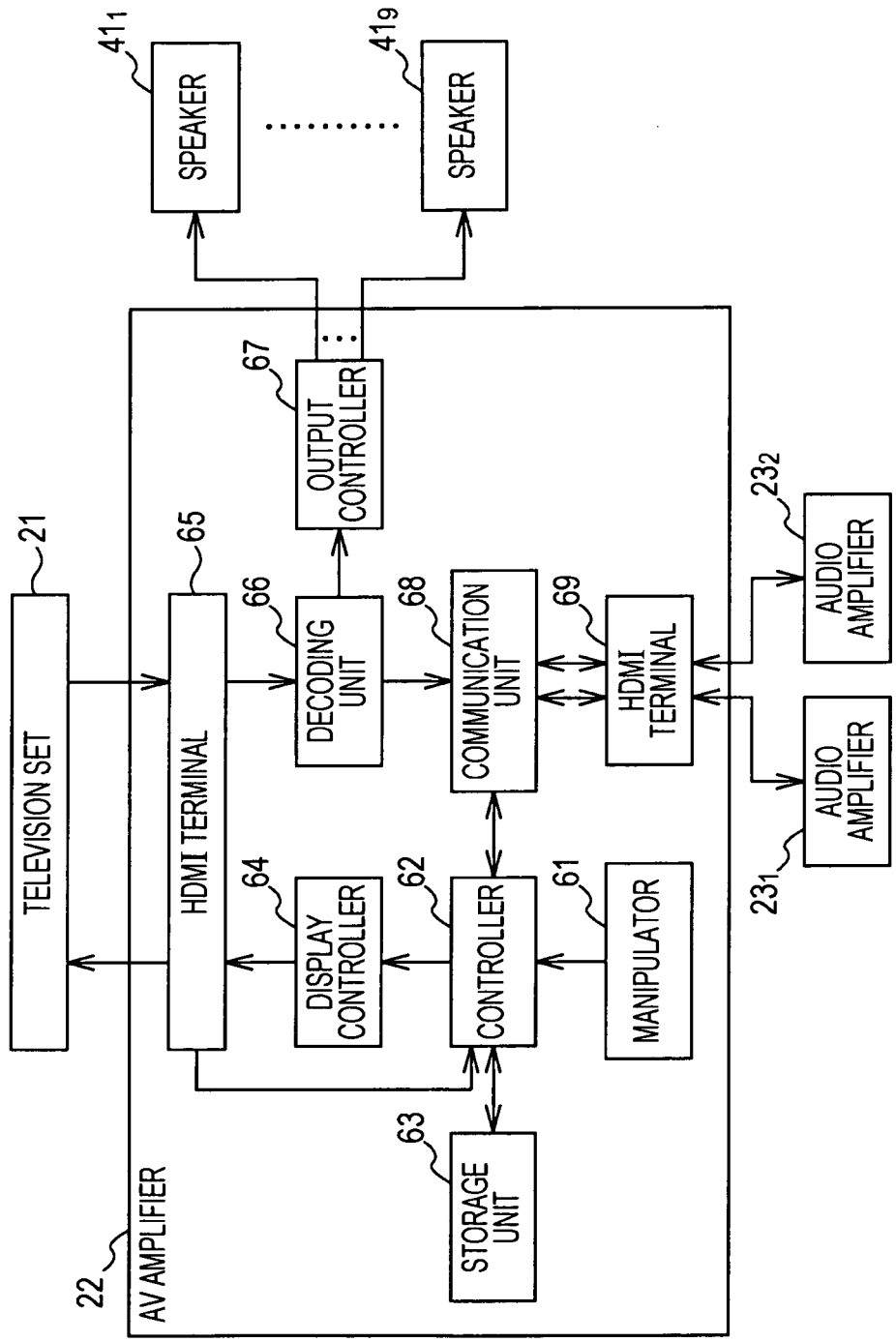
FIG. 5 is a block diagram illustrating an example of a configuration of an AV amplifier.

FIG. 5 illustrates an example of configuration of the AV amplifier 22.

The AV amplifier 22 is configured to include a manipulator 61, a controller 62, a storage unit 63, a display controller 64, an HDMI terminal 65, a decoding unit 66, an output controller 67, a communication unit 68, and am HDMI terminal 69.

The manipulator 61 is constructed with buttons or the like for, for example, setting the sound volume and is manipulated by the user. In addition, the manipulator 61 supplies manipulation signals corresponding to user's manipulations to the controller 62.

The controller 62 performs processes in response to the corresponding manipulation signals, for example, from the manipulator 61. In other words, for example, the controller 62 generates commands or the like for controlling the audio amplifier $23_1$ or the audio amplifier $23_2$ and supplies the commands to the communication unit 68 in response to the manipulation signal from the manipulator 61.

In addition, for example, based on the command (command from the audio amplifier $23_1$ or the audio amplifier $23_2$) from the communication unit 68 or the command (command from the television set 21) from the HDMI terminal 65, the controller 62 performs corresponding processes.

In addition, the controller 62 controls the display controller 64, the decoding unit 66, the output controller 67, the communication unit 68, and the like. More specifically, for example, the controller 62 controls the display controller 64 to display the speaker allocating screen of FIG. 3 on the television set 21.

The storage unit 63 is configured with, for example, a hard disk, an EEPROM (electrically erasable and programmable read only memory), or the like to store (sustains) the EDID of the AV amplifier 22 or necessary data in advance.

In addition, the storage unit 63 stores data or the like in response to a storing instruction of the controller 62.

The display controller 64 supplies, for example, a speaker allocating screen or the like of FIG. 3 from the HDMI terminal 65 via the TMDS channel line of the HDMI cable to the television set 21 to be displayed according to the control of the controller 62.

The HDMI terminal 65 is a connection terminal connecting the HDMI cable connected to the television set 21. The HDMI terminal 65 supplies the data from the display controller 64 through the connected HDMI cable to the television set 21.

In addition, the HDMI terminal 65 supplies the encoded audio data supplied via the ARC line of the HDMI cable from the television set 21 to the decoding unit 66.

In addition, the HDMI terminal 65 supplies the command supplied via the CEC line of the HDMI cable from the television set 21 to the controller 62.

In addition, for example, when the user manipulates a remote controller of the television set 21, the television set 21 generates the command in response to the manipulation signal transmitted from the remote controller and supplies the command via the CEC line of the HDMI cable to the HDMI terminal 65.

The decoding unit 66 decodes the encoded audio data supplied from the HDMI terminal 65 according to the corresponding decoding method. Next, the decoding unit 66 supplies the 8.1-channel (9-channel) audio data among the 22.2-channel (24-channel) audio data obtained by the decoding to the output controller 67.

In addition, the decoding unit 66 supplies the remaining 14.1-channel (15-channel) audio data among the 22.2-channel (24-channel) audio data obtained by the decoding to the communication unit 68.

The output controller 67 supplies the 8.1-channel audio data from the decoding unit 66 to the corresponding speakers $41_1$ to $41_9$ and outputs the corresponding sounds.

The communication unit 68 supplies the 7.1-channel (8-channel) audio data among the 14.1-channel audio data supplied from the decoding unit 66 to the HDMI terminal 69 and transmits the 7.1-channel (8-channel) audio data via the TMDS channel line of the HDMI cable connected to the HDMI terminal 69 to the audio amplifier $23_1$.

In addition, the communication unit 68 supplies the remaining 7-channel audio data among the 14.1-channel audio data supplied from the decoding unit 66 to the HDMI terminal 69 and transmits the 7-channel audio data via the TMDS channel line of the HDMI cable connected to the HDMI terminal 69 to the audio amplifier $23_2$.

In addition, the communication unit 68 supplies the command from the controller 62 via the CEC line of the HDMI cable connected to the HDMI terminal 69 to the audio amplifier $23_1$ or the audio amplifier $23_2$. In addition, the communication unit 68 supplies the command supplied from the audio amplifier $23_1$ or the audio amplifier $23_2$ via the CEC line of the HDMI cable connected to the HDMI terminal 69 to the controller 62.

The HDMI terminal 69 is configured to include, for example, a connection terminal connecting one end of the HDMI cable connected to the audio amplifier $23_1$ and a connection terminal connecting one end of the HDMI cable connected to the audio amplifier $23_2$.

The HDMI terminal 69 supplies the command or the like from the communication unit 68 through the HDMI cable to the audio amplifier $23_1$ or the audio amplifier $23_2$ and supplies the command or the like supplied from the audio amplifier $23_2$ or the audio amplifier $23_2$ through the HDMI cable to the communication unit 68.

Hereinafter, in the case where the audio amplifier $23_1$ and the audio amplifier $23_2$ may not have to be distinguished from each other, the audio amplifier $23_1$ and the audio amplifier $23_2$ are simply referred to as an audio amplifier 23.

Example of Configuration of Audio Amplifier 23

Figure 6:
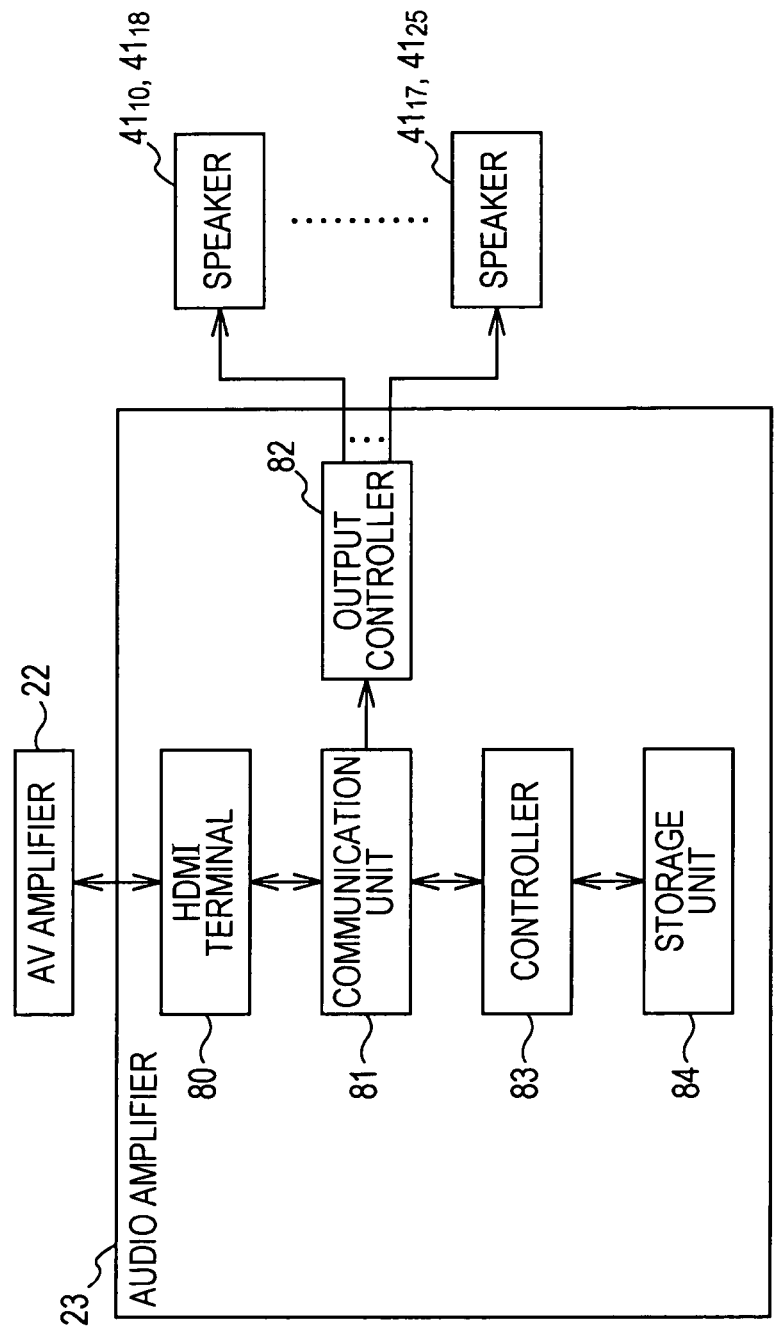
FIG. 6 is a block diagram illustrating an example of a configuration of an audio amplifier.

FIG. 6 illustrates an example of a configuration of the audio amplifier 23.

The audio amplifier 23 is configured to include an HDMI terminal 80, a communication unit 81, an output controller 82, a controller 83, and a storage unit 84.

The HDMI terminal 80 is connected to one end of the HDMI cable connected to the AV amplifier 22, so that the audio data, the command, or the like are supplied from the AV amplifier 22 through the HDMI cable to the HDMI terminal 80.

The HDMI terminal 80 supplies the command or the like from the AV amplifier 22 to the communication unit 81. In addition, the HDMI terminal 80 supplies the command or the like from the communication unit 81 through the HDMI cable to the AV amplifier 22.

The communication unit 81 supplies the audio data from the HDMI terminal 80 to the output controller 82.

In other words, for example, in the case of the audio amplifier 23 of FIG. 6 is the audio amplifier $23_1$, the communication unit 81 receives the 7.1-channel (8-channel) audio data from the HDMI terminal 80 and supplies the audio data to the output controller 82.

In addition, for example, in the case where the audio amplifier 23 of FIG. 6 is the audio amplifier $23_2$, the communication unit 81 receives the 7-channel audio data from the HDMI terminal 80 and supplies the audio data to the output controller 82.

In addition, the communication unit 81 supplies the command or the like from the HDMI terminal 80 to the controller 83. In addition, the communication unit 81 supplies the command or the like from the controller 83 to the HDMI terminal 80.

The output controller 82 supplies the audio data from the communication unit 81 to the speaker to output the corresponding sound.

The controller 83 controls the communication unit 81 and the output controller 82. In addition, the controller 83 performs processes based on the corresponding commands from the communication unit 81. In other words, for example, the controller 83 generates a command for transmission to the AV amplifier 22 and supplies the command to the communication unit 81 based on a command from the communication unit 81.

The storage unit 84 is configured with, for example, a hard disk, an EEPROM, or the like to store the EDID of the audio amplifier 23 or necessary data in advance. In addition, the storage unit 84 stores data or the like in response to a storing instruction of the controller 83.

Example of Speaker Designating Process Performed by AV Amplifier 22

Next, a speaker designating process where the AV amplifier 22 designates the 22.2-channel (24-channel) audio data obtained by decoding the encoded audio data from the television set 21 to the speakers $41_1$ to $41_{24}$ outputting the audio data is described with reference to a flowchart of FIG. 7.

The speaker designating process starts when the user performs a display manipulation for displaying a speaker allocating screen by using the remote controller of the television set 21 or the manipulator 61 of the AV amplifier 22.

In the case where the display manipulation is performed by using the remote controller of the television set 21, the television set 21 generates a first manipulation command based on the manipulation signal according to the user's display manipulation transmitted from the remote controller and supplies the first manipulation command via the CEC line of the HDMI cable to the HDMI terminal 65.

The HDMI terminal 65 supplies the first manipulation command supplied via the CEC line of the HDMI cable from the television set 21 to the controller 62.

In addition, in the case where the display manipulation is performed by using the manipulator 61, the manipulator 61 supplies the manipulation signal according to the user's display manipulation to the controller 62.

In Step S1, the controller 62 generates a channel request command for requesting channel information including the number of channels of the audio data that the audio amplifier 23 may be able to output to the speakers or information indicating whether to have a channel for LFE as a channel of the audio data based on the first manipulation command from the HDMI terminal or the manipulation signal from the manipulator 61 and supplies the channel request command to the communication unit 68.

The communication unit 68 supplies the channel request command from the controller 62 via the CEC line of the HDMI cable connected to the HDMI terminal 69 to the audio amplifier 23.

In this case, the audio amplifier 23 generates a response command added with channel information of the audio amplifier 23 and supplies the response command via the CEC line of the HDMI cable through the HDMI terminal 69 to the communication unit 68 in response to the channel request command from the communication unit 68.

In Step S2, the communication unit 68 receives the response command from the audio amplifier 23 and supplies the response command to the controller 62.

In Step S3, the controller 62 extracts the channel information of the audio amplifier 23 added to the response command from the communication unit 68. In addition, the controller 62 reads the channel information of the AV amplifier 22 stored in the storage unit 63 from the storage unit 63. Next, the controller 62 generates a speaker allocating screen based on the extracted channel information of the audio amplifier 23 and the read channel information of the AV amplifier 22 and supplies the speaker allocating screen to the display controller 64.

The display controller 64 supplies the speaker allocating screen from the controller 62 via the TMDS channel line of the HDMI cable connected to the HDMI terminal 65 to the television set 21 to be displayed thereon.

Next, the user performs a designating manipulation of designating the speakers $41_1$ to $41_{24}$ outputting the audio data corresponding to the 22.2 channels among the speakers $41_1$ to $41_{25}$ by using the remote controller of the television set 2 or the manipulator 61 while referring to the speaker allocating screen displayed on the television set 21.

In the case where the designating manipulation is performed by using the remote controller of the television set 2, the television set 21 generates a second manipulation command based on the manipulation signal according to the user's designating manipulation transmitted from the remote controller and supplies the second manipulation command via the CEC line of the HDMI cable to the HDMI terminal 65.

The HDMI terminal 65 supplies the second manipulation command supplied via the CEC line of the HDMI cable from the television set 21 to the controller 62.

In addition, in the case where a designating manipulation is performed by using the manipulator 61, the manipulator 61 supplies a manipulation signal corresponding to the user's designating manipulation to the controller 62.

In Step S4, the controller 62 generates mapping information of the speakers $41_1$ to $41_9$ based on the second manipulation command from the HDMI terminal 65 or the manipulation signal from the manipulator 61 and stores the mapping information in the storage unit 63.

In addition, the controller 62 generates an allocation command added with the mapping information, which represents the allocation of the audio data to the speakers $41_{10}$ to $41_{25}$ connected to the audio amplifier 23 as illustrated in FIG. 4, based on the second manipulation command from the HDMI terminal 65 or the manipulation signal from the manipulator 61 and supplies the allocation command to the communication unit 68. In other words, the controller 62 generates the allocation command added with the mapping information, which represents the allocation of the audio data to the speakers $41_{10}$ to $41_{17}$, as an allocation command for the audio amplifier $23_1$ and supplies the allocation command to the communication unit 68. In addition, the controller 62 generates the allocation command added with the mapping information, which represents the allocation of the audio data to the speakers $41_{18}$ to $41_{25}$, as an allocation command for the audio amplifier $23_2$ and supplies the allocation command to the communication unit 68.

Next, in Step S5, the communication unit 68 supplies the allocation command from the controller 62 via the CEC line of the HDMI cable connected to the HDMI terminal 69 to the audio amplifier 23. In other words, the communication unit 68 supplies the allocation command for the audio amplifier $23_1$ supplied from the controller 62 to the audio amplifier $23_1$ and supplies the allocation command for the audio amplifier $23_2$ supplied from the controller 62 to the audio amplifier $23_2$.

Example of Speaker Setting Process Performed by Audio Amplifier 23

Next, a speaker setting process where the audio amplifier 23 sets the speaker designated by the user's designating manipulation to output the corresponding audio data is described with reference to a flowchart of FIG. 8.

In Step S21, the communication unit 81 supplies the channel request command transmitted through the HDMI terminal 80 via the CEC line of the HDMI cable connected to the HDMI terminal 80 from the AV amplifier 22 to the controller 83.

The controller 83 reads channel information of the audio amplifier 23 stored in the storage unit 84 from the storage unit 84 in response to the channel request command from the communication unit 81. Next, the controller 83 generates a response command added with the read channel information and supplies the response command to the communication unit 81.

The communication unit 81 supplies the response command from the controller 83 to the HDMI terminal 80 and supplies the response command via the CEC line of the HDMI cable connected to the HDMI terminal 80 to the AV amplifier 22.

Therefore, the AV amplifier 22 displays the speaker allocating screen illustrated in FIG. 3 on the television set 21 based on the channel information or the like added to the response command from the communication unit 81. Next, the AV amplifier 22 performs the speaker allocation in response to the user's designating manipulation and supplies the resulting allocation command via the CEC line to the communication unit 81.

In Step S22, the communication unit 81 receives the allocation command supplied via the CEC line of the HDMI cable connected to the HDMI terminal 80 through the HDMI terminal 80 from the AV amplifier 22 and supplies the allocation command to the controller 83.

In Step S23, the controller 83 supplies mapping information added to the allocation command to the storage unit 84 based on the allocation command from the communication unit 81 to store the mapping information of the audio amplifier 23 by overwriting.

As described hereinbefore, in the speaker designating process and the speaker setting process, since the speaker allocation is performed via the CEC line of the HDMI cable, it is not necessary that the user performs the speaker allocation by separately manipulate the AV amplifier 22 and the audio amplifiers $23_1$ and $23_2$.

In addition, since the speaker allocation is performed via the CEC line of the HDMI cable, it is not necessary that a particular control cable (interface) is used for communication of control signals (commands) like, for example, a sound output system in the related art.

In the embodiment, the 22.2-channel audio data are allowed to be output by connecting the AV amplifier 22 outputting the 9-channel audio data and the audio amplifiers $23_1$ and $23_2$ outputting the 8-channel audio data.

Therefore, it is not necessary to produce one new audio amplifier or AV amplifier outputting the 22.2-channel (24-channel) audio data. For example, the 22.2-channel audio data may be able to be output by connecting a plurality of existing audio amplifiers or AV amplifiers.

Example of EDID Generating Process Performed by AV Amplifier 22

Next, an EDID generating process where the AV amplifier 22 generates the EDID of the output control system 1 is described with reference to a flowchart of FIG. 9.

The EDID generating process starts, for example, when the audio amplifier 23 is newly connected, when the AV amplifier 22 is driven again so that connection to the connected audio amplifier $23_i$ is reset (cut off), or the like.

The communication unit 68 detects the number of audio amplifiers $23_i$ connected through the HDMI terminal 69 and supplies the number to the controller 62.

In Step S41, the controller 62 inserts the value 1 to the variable i. In addition, the controller 62 inserts imax into the number of audio amplifiers $23_i$ supplied from the communication unit 68.

In Step S42, the controller 62 instructs the communication unit 68 to read the EDIDs of the audio amplifiers $23_i$. The communication unit 68 reads the EDIDs of the audio amplifiers $23_i$ and supplies the EDIDs of the audio amplifiers $23_i$ to the controller 62 via the DDC line of the HDMI cable connected to the HDMI terminal 69 according to the EDID read instruction from the controller 62.

In Step S43, the controller 62 determines whether or not the variable i is smaller than the imax. Next, in the case where the variable i is determined to be smaller than the imax, that is, in the case where all the EDIDs of the audio amplifiers $23_i$ are determined not yet to be acquired, the controller 62 allows the process to proceeds to Step S44.

In Step S44, the controller 62 adds the value 1 to the variable i and allows the process to return to Step S42. Next, the same following processes are performed.

In addition, in Step S43, in the case where the variable i is determined not to be smaller than the imax, that is, in the case where all the EDIDs of the audio amplifiers $23_i$ are determined to be acquired, the controller 62 allows the process to proceed to Step S45.

In Steps S45 to Step S48, the controller 62 generates the EDID of the output control system 1 based on the acquired EDIDs of the audio amplifiers $23_i$ and the EDID of the AV amplifier 22 stored in the storage unit 63.

In other words, for example, in Step S45, the controller 62 acquires the number of channels of the audio amplifiers $23_i$ based on the EDIDs of the audio amplifiers $23_i$ supplied from the communication unit 68 in the process of Step S42.

In this case, since the AV amplifier 22 is connected to the audio amplifier $23_1$ and the audio amplifier $23_2$ and since each of the audio amplifiers $23_1$ and the audio amplifier $23_2$ has eight channels, the controller 62 acquires the number of channels to be eight as the number of channels of each of the audio amplifier $23_1$ and the audio amplifier $23_2$.

In Step S46, the controller 62 reads the EDID of the AV amplifier 22 from the storage unit 63 and acquires the number of channels of the AV amplifier 22 based on the read EDID of the AV amplifier 22. In this case, since the AV amplifier 22 has nine channels, the controller 62 acquires the number of channels to be nine as the number of channels of the AV amplifier 22.

Next, the controller 62 sums up the acquired number (8) of channels of the audio amplifier $23_1$, the acquired number (8) of channels of the audio amplifier $23_2$ and the acquired number (9) of channels of AV amplifier 22 and sets the resulting number (25) of channels as the number of channels of the output control system 1.

In Step S47, the controller 62 detects a decoding method (decodable encoding method) performed by the decoding unit 66 of the AV amplifier 22 based on the EDID of the AV amplifier 22 read from the storage unit 63 and sets the detected decoding method as a decoding method of the output control system 1.

In Step S48, the controller 62 detects latencies of the audio amplifiers $23_i$ based on the EDIDs of the audio amplifiers $23_i$. In addition, the controller 62 detects a latency of the AV amplifier 22 based on the EDID of the AV amplifier 22.

Next, the controller 62 sets the largest latency among the detected latencies of the audio amplifiers $23_i$ and the detected latency of the AV amplifier 22 as the latency of the output control system 1.

The controller 62 generates an EDID including the set number of channels of the output control system 1, the set decoding method, and the set latency as the EDID of the output control system 1 and supplies the EDID of the output control system 1 to the storage unit 63 to store therein. Accordingly, the EDID generating process ends.

In addition, in the output control system 1, the largest latency among the latencies of the audio amplifiers $23_i$ and the latency of the AV amplifier 22 is set as the latency of the output control system 1.

Next, in the output control system 1, the largest latency set as the latency of the output system 1 is shared by the AV amplifier 22, the audio amplifier $23_1$, and the audio amplifier $23_2$. Each of the AV amplifier 22, the audio amplifier $23_1$, and the audio amplifier $23_2$ outputs the sound with the shared latency of the output control system 1.

More specifically, for example, the AV amplifier 22 calculates a latency which is to be added so as to change the latency of the AV amplifier 22 (including the EDID of the AV amplifier 22) into the latency of the output control system 1 based on the latency of the output control system 1 (including the EDID of the output control system 1). Next, the AV amplifier 22 adds the calculated latency to the latency of the AV amplifier 22 and allows the speakers $41_1$ to $41_9$ to output the sounds by using the latency of the output control system 1 obtained by the addition as the latency of the AV amplifier 22.

In addition, the AV amplifier 22 notifies (informs) the latency of the output control system 1 via the CEC line to the audio amplifiers $23_1$ and $23_2$.

The audio amplifier $23_1$ calculates a latency which is to be added so as to change the latency of the audio amplifier $23_1$ (including the EDID of the audio amplifier $23_1$) into the latency of the output control system 1 based on the latency of the output control system 1 notified from the AV amplifier 22. Next, the audio amplifier $23_1$ adds the calculated latency to the latency of the audio amplifier $23_1$ and allows the speakers $41_{10}$ to $41_{17}$ to output the sounds by using the latency of the output control system 1 obtained by the addition as the latency of the audio amplifier $23_1$.

In addition, the audio amplifier $23_2$ calculates a latency which is to be added so as to change the latency of the audio amplifier $23_2$ (including the EDID of the audio amplifier $23_2$) into the latency of the output control system 1 based on the latency of the output control system 1 notified from the AV amplifier 22. Next, the audio amplifier $23_2$ adds the calculated latency to the latency of the audio amplifier $23_2$ and allows the speakers $41_{18}$ to $41_{24}$ to output the sounds by using the latency of the output control system 1 obtained by the addition as the latency of the audio amplifier $23_2$.

Accordingly, in the output control system 1, the sounds are output from the speakers $41_1$ to $41_{24}$ at the same timing (latency).

Example of EDID Supplying Process Performed by Audio Amplifier 23

Figure 10:
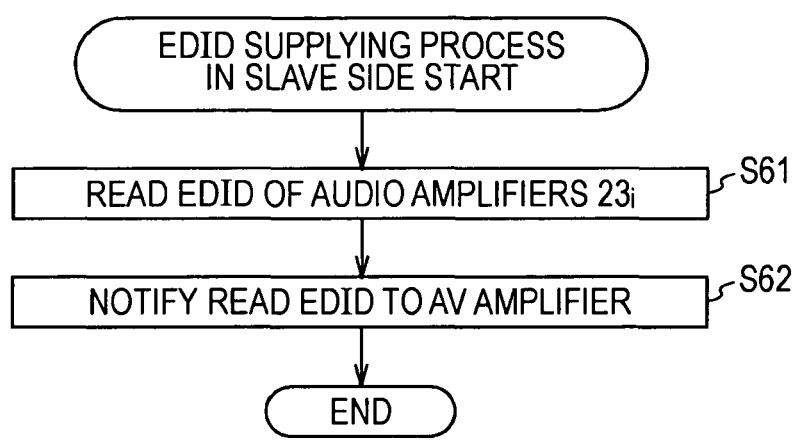
FIG. 10 is a flowchart illustrating an EDID supplying process performed by an audio amplifier.

Next, an EDID supplying process where the audio amplifier $23_i$ supplies the EDIDs of the audio amplifiers $23_i$ to the AV amplifier 22 is described with reference to a flowchart of FIG. 10.

In Step S61, the communication unit 81 reads the EDIDs of the audio amplifiers $23_i$ stored in advance in the storage unit 84 from the storage unit 84 and notifies a message that the reading preparation is completed through the HDMI terminal 80 to the AV amplifier 22.

In Step S62, the controller 83 supplies the read EDIDs of the audio amplifiers $23_i$ to the communication unit 81. The communication unit 81 supplies the EDIDs of the audio amplifiers $23_i$ from the controller 83 via the DDC line to the AV amplifier 22 in response to the request of the AV amplifier 22.

As described hereinbefore, in the EDID generating process, the EDID of the output control system 1 is configured to be generated based on the EDID of the audio amplifiers $23_1$ and $23_2$ and the EDID of the AV amplifier 22 transmitted in the EDID supplying process.

Therefore, for example, a different apparatus connected through the HDMI cable to the AV amplifier 22 may be able to treat the AV amplifier 22 and the audio amplifiers $23_1$ and $23_2$ as one output control system 1 by receiving the EDID of the output control system 1 supplied via the DDC line from the AV amplifier 22.

In addition, since the AV amplifier 22 performs the reading of the EDIDs of the audio amplifiers $23_1$ and $23_2$ via the DDC line of the HDMI cable, a particular control cable used for controlling is not necessary unlike a sound output system in the related art.

Therefore, in addition to adjusting the sound volumes of the sounds output from the speakers $41_1$ to $41_9$, muting the sound volumes to zero (muting), or the like, the AV amplifier 22 may be able to adjusting the sound volumes or the like of the sounds output from the speakers $41_{10}$ to $41_{24}$ by controlling the audio amplifiers $23_1$ and $23_2$ via the CEC line.

However, for example, in the case where the AV amplifier 22 sets the sound volumes of the speakers $41_1$ to $41_9$ to a predetermined sound strength (decibel value) and notifies the predetermined sound strength via the CEC line to the audio amplifier $23_1$ or the audio amplifier $23_2$ so as to adjust the sound volumes of the speakers $41_1$ to $41_{25}$, there occurs a considerably large difference between the sound volumes of the sounds output from the speakers $41_1$ to $41_9$ and the sound volumes of the sounds output from the speakers $41_{10}$ to $41_{24}$ due to the sound output efficiencies of the speakers $41_1$ to $41_{25}$.

In other words, for example, although the AV amplifier 22 allows the speakers $41_1$ to $41_9$ to output the sounds at the predetermined sound strength, the audio amplifier $23_1$ or the audio amplifier $23_2$ may allow the speakers $41_{10}$ to $41_{17}$ or the speakers $41_{18}$ to $41_{24}$ to output the sounds at a strength different from the predetermined sound strength.

In this case, the output levels of the audio data corresponding to the 22.2 channels are different from each other, so that this may be disagreeable to the user. Therefore, the output levels may have to be adjusted.

Figure 12:
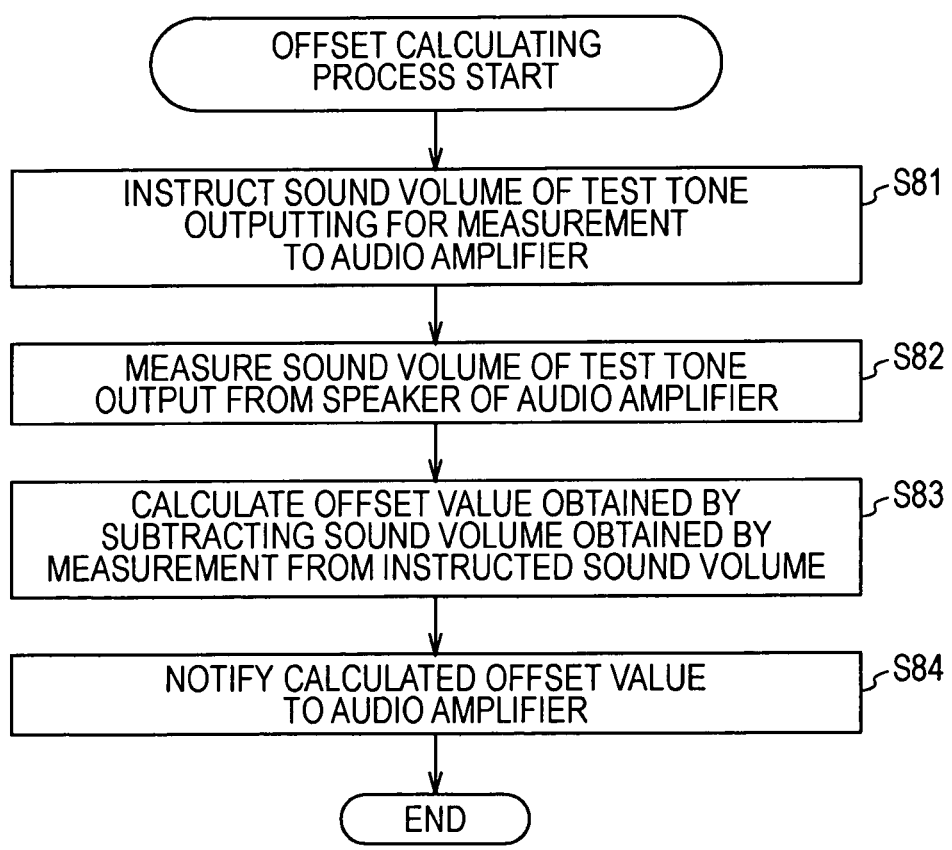
FIG. 12 is a flowchart illustrating an offset calculating process performed by an AV amplifier.
Figure 13:
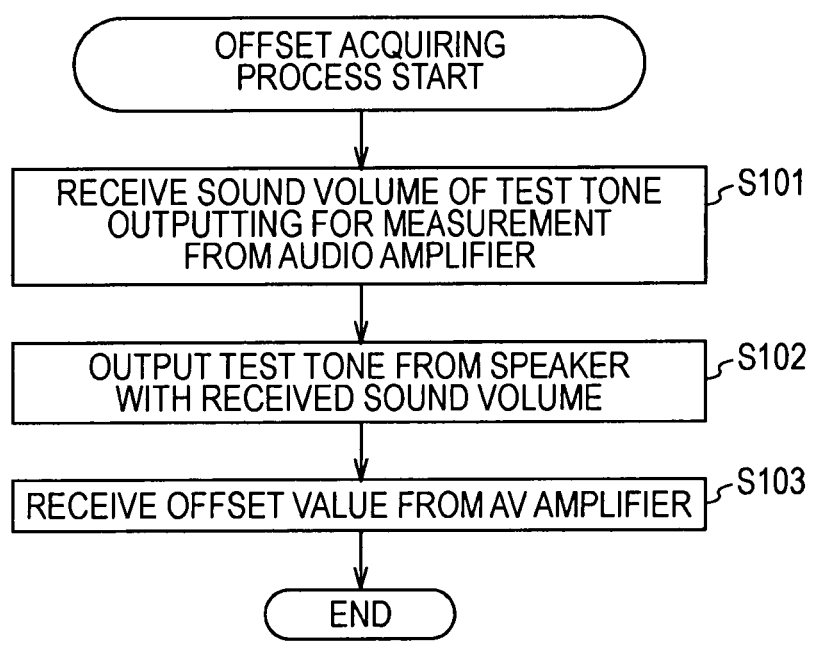
FIG. 13 is a flowchart illustrating an offset acquiring process performed by an audio amplifier.

The method of the adjustment is described with reference to FIGS. 11 to 13.

Figure 11:
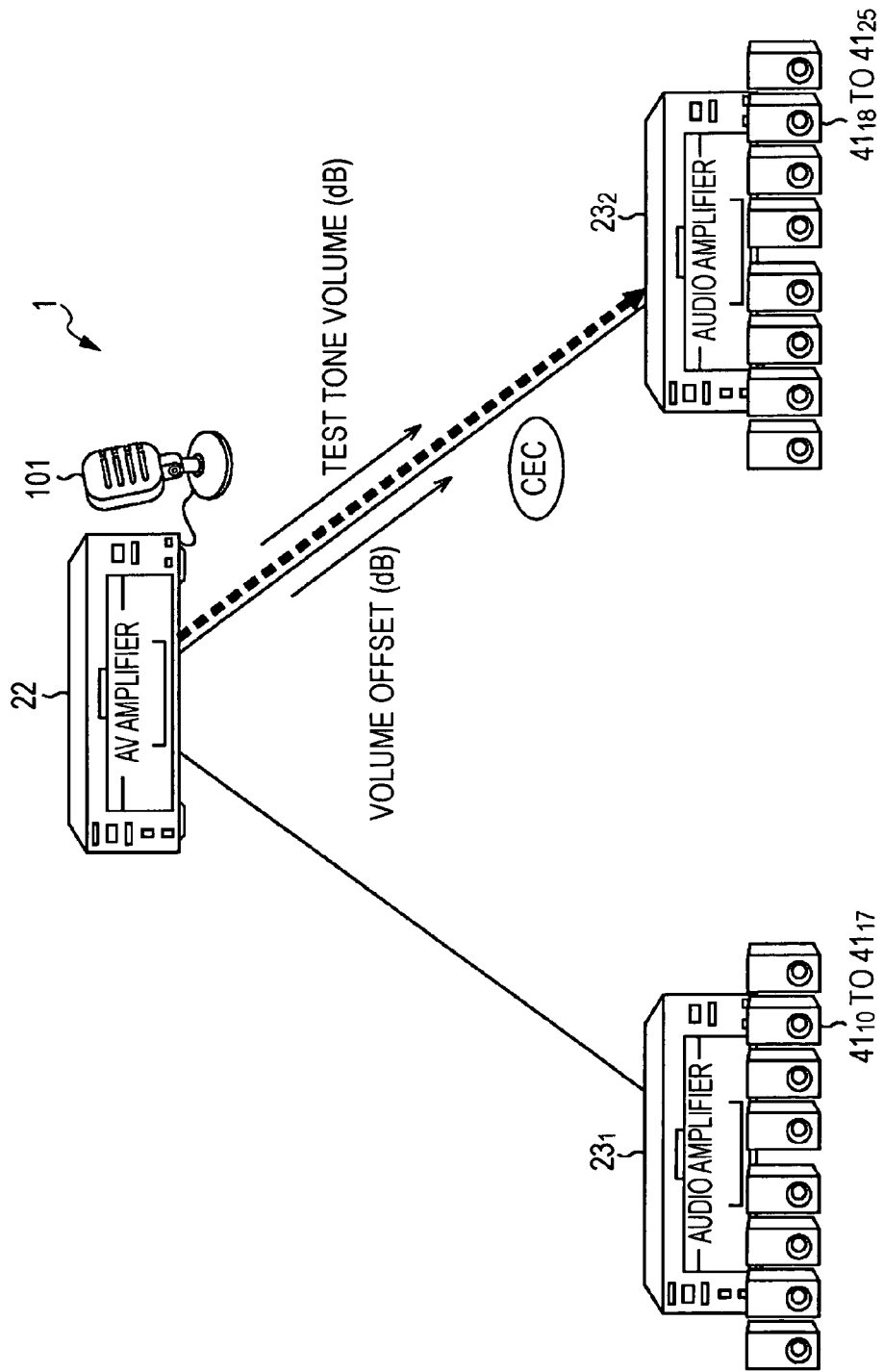
FIG. 11 is a diagram illustrating an example of an output control system formed in the case where sound volume adjustment is performed.

FIG. 11 illustrates the output control system 1 which is configured in the case of performing the sound volume adjustment.

In addition, in the case of adjusting the sound volume, the output control system 1 is configured so that the microphone 101 is connected to the AV amplifier 22.

In other words, the configuration of the output control system 1 is the same as that of the output control system 1 of FIG. 1 except that the microphone 101 is connected to the AV amplifier 22.

The AV amplifier 22 notifies an instruction command added with test sound volume information indicating a strength of sound (decibel value) of a test tone as an instruction command instructing the output of the test tone, which is a sound output for measurement, via the CEC line of the HDMI cable, for example, to the audio amplifier $23_2$.

Therefore, the audio amplifier $23_2$ allows, for example, the speaker $41_{18}$ among the speakers $41_{18}$ to $41_{25}$ to output the test tone in response to the instruction command from the AV amplifier 22.

The microphone 101 connected to the AV amplifier 22 collects the test tone output from the speaker $41_{18}$ and supplies the resulting sound signal to the AV amplifier 22.

The AV amplifier 22 detects a decibel value as the sound volume of the test tone from the speaker $41_{18}$ connected to the audio amplifier $23_2$ based on the sound signal from the microphone 101.

Next, the AV amplifier 22 calculates an offset value obtained by subtracting the detected decibel value of the test tone from the decibel value indicated by the test sound volume information added to the instruction command and notifies the offset command added with the calculated offset value via the CEC line to the audio amplifier $23_2$.

Therefore, for example, in the case where the audio amplifier $23_2$ is instructed to output the sound with the sound volume of a predetermined decibel value (for example, 30 dB) from the AV amplifier 22, the instructed decibel value of 30 dB is added to the offset value added to the offset command from the AV amplifier 22, and the sounds are allowed to be output from the speakers $41_{18}$ to $41_{25}$ at the obtained decibel value (in the embodiment, the sounds are allowed to be output from the speakers $41_{18}$ to $41_{24}$), so that a difference in the sound volume between the sounds output from the speakers $41_1$ to $41_9$ and the sounds output from the speakers $41_{18}$ to $41_{25}$ is reduced.

In addition, similarly to the case of the audio amplifier $23_1$, the AV amplifier 22 performs the same processes on the audio amplifier $23_2$ and notifies the offset command added with the resulting offset value via the CEC line to the audio amplifier $23_1$.

Hereinafter, processes which are performed for adjusting a difference in output sound volume between the AV amplifier 22 and the audio amplifier $23_2$ are described with reference to FIGS. 12 and 13. In addition, processes performed between the AV amplifier 22 and the audio amplifier $23_1$ are the same as the processes performed between the AV amplifier 22 and the audio amplifier $23_2$, and thus, the description thereof is omitted.

Example of Offset Calculating Process Performed by AV Amplifier 22

Next, an offset calculating process which the AV amplifier 22 performs on the audio amplifier $23_2$ is described with reference to a flowchart of FIG. 12.

In Step S81, the controller 62 generates an instruction command added with test sound volume information indicating a sound volume of a test tone as an instruction command instructing the output of the test tone for measurement and supplies the instruction command to the communication unit 68.

The communication unit 68 supplies the instruction command from the controller 62 to the HDMI terminal 69 and transmits the instruction command via the CEC line of the HDMI cable connected to the HDMI terminal 69 to the audio amplifier $23_2$.

In this case, the audio amplifier $23_2$ allows, for example, the speaker $41_{18}$ to output a test tone with a sound volume of test sound volume information added to the instruction command based on the instruction command from the communication unit 68.

In Step S82, the microphone 101 connected to the AV amplifier 22 collects the test tone output from the speaker $41_{18}$ and supplies the resulting sound signal to the connected controller 62.

The controller 62 measures a strength of sound (decibel value) of the test tone output from the speaker $41_{18}$ connected to the audio amplifier $23_2$ based on the sound signal supplied from the microphone 101 connected to the AV amplifier 22.

In Step S83, the controller 62 calculates an offset value obtained by subtracting the decibel value obtained by the measurement from a decibel value corresponding to the sound volume of the test tone instructed by using the instruction command.

In Step S84, the controller 62 generates an offset command added with the calculated offset value and supplies the offset command to the communication unit 68. The communication unit 68 supplies the offset command from the controller 62 to the HDMI terminal 69 and notifies the offset command via the CEC line of the HDMI cable connected to the HDMI terminal 69 to the audio amplifier $23_2$.

Offset Acquiring Process Performed by Audio Amplifier $23_2$

Next, an offset acquiring process performed by the audio amplifier $23_2$ is described with reference to a flowchart of FIG. 13.

In Step S101, the communication unit 81 receives an instruction command added with test sound volume information indicating a sound volume of a test tone supplied via the CEC line of the HDMI cable connected to the HDMI terminal 80 through the HDMI terminal 80 from the AV amplifier 22 and supplies the instruction command to the controller 83.

In Step S102, the controller 83 controls the output controller 82 based on the instruction command from the communication unit 81 to output the test tone with the sound volume indicated by the test sound volume information added to the instruction command, for example, from the speaker $41_{18}$.

Therefore, the microphone 101 connected to the AV amplifier 22 collects the test tone output from the speaker $41_{18}$ and supplies the resulting sound signal to the AV amplifier 22. The AV amplifier 22 notifies an offset command added with an offset value calculated based on the sound signal from the connected microphone 101 through the HDMI terminal 80 to the communication unit 81 of the audio amplifier $23_2$.

In Step S103, the communication unit 81 receives the offset command added with the offset value supplied via the CEC line of the HDMI cable connected to the HDMI terminal 80 through the HDMI terminal 80 from the AV amplifier 22 and supplies the offset command to the controller 83. The controller 83 supplies the offset value added to the offset command to the storage unit 84 to store the offset value therein based on the offset command from the communication unit 81.

As described hereinbefore, in the offset calculating process, the AV amplifier 22 is configured to calculate a difference between the sound volume output from the AV amplifier 22 and the sound volume output from the audio amplifier $23_2$ as the offset value, and in the offset acquiring process, the audio amplifier $23_2$ is configured to acquire the offset value calculated by the AV amplifier 22.

Therefore, for example, in the case where the AV amplifier 22 notifies a command for allowing the speakers $41_{18}$ to $41_{25}$ to output the sounds at a predetermined decibel value to the audio amplifier $23_2$, the audio amplifier $23_2$ is controlled to allow the speakers $41_{18}$ to $41_{25}$ to output the sounds at a new decibel value obtained by adding the acquired offset value and the predetermined decibel value instructed by the AV amplifier 22.

In this case, in the audio amplifier $23_2$, due to the sound output efficiencies or the like of the speakers $41_{18}$ to $41_{25}$, the sound volumes are lowered by the offset value, so that the sounds are output at the predetermined decibel value instructed by the AV amplifier 22.

Accordingly, in the audio amplifier $23_2$, the sound may be output at the decibel value instructed by the AV amplifier 22. The same description may also be made with respect to the audio amplifier $23_1$.

In this manner, in the AV amplifier 22, the audio amplifier $23_1$, and the audio amplifier $23_2$, the sounds may be output at the same decibel value.

In addition, the AV amplifier 22 has a reproduced sound volume up/down function of increasing or decreasing the sound volume by one unit (by a predetermined decibel value) such as a sound volume adjusting button of a remote controller.

Therefore, the AV amplifier 22 may be able to instruct the audio amplifier $23_1$ or the audio amplifier $23_2$ to increase the sound volumes of the speakers $41_1$ to $41_{25}$ by one unit (by a predetermined decibel value) by using the reproduced sound volume up/down function.

However, since the decibel value changed in the case of increasing the sound volume by one unit is generally different according to the AV amplifier 22, the audio amplifier $23_1$, and the audio amplifier $23_2$, if the audio amplifiers $23_1$ and $23_2$ are controlled to increase the sound volumes by one unit at the same time when the AV amplifier 22 increases the sound volumes of the speakers $41_1$ to $41_9$ by one, there occurs a difference between the sound volumes output from the speakers $41_1$ to $41_{25}$.

For this reason, for example, in the case where the AV amplifier 22 is manipulated to increase the sound volume by a predetermined decibel value by the user, the audio amplifiers $23_1$ and $23_2$ are controlled so that the sounds are output from the speakers $41_{18}$ to $41_{25}$ at the decibel value that is obtained by adding a constant decibel value changed in the case of increasing the sound volume unique to the AV amplifier by one unit to the decibel value indicating the sound volumes of the speakers $41_1$ to $41_9$.

In addition, in the audio amplifier $23_2$, a difference caused by the sound outputting efficiencies or the like of the speakers $41_{18}$ to $41_{25}$ is configured to be adjusted by adding the offset value for the audio amplifier $23_2$ calculated by the AV amplifier 22 to the predetermined decibel value instructed by the AV amplifier 22. However, the present invention is not limited thereto.

In other words, for example, in the AV amplifier 22, a new decibel value obtained by adding the calculated offset value for the audio amplifier $23_2$ to the predetermined decibel value is calculated, and the audio amplifier $23_2$ is controlled to output the sound at the calculated new decibel value. Accordingly, in the audio amplifier $23_2$, the sound is output at the predetermined decibel value. The same description may also be made with respect to the audio amplifier $23_1$.

2. Modified Example

In the embodiment, in the output control system 1, the AV amplifier 22 supplies the 7.1-channel audio data via the TMDS channel line to the audio amplifier $23_1$ and supplies the 7-channel audio data via the TMDS channel line to the audio amplifier $23_2$ among the 22.2-channel audio data obtained by decoding the encoded audio data from the television set 21. However, the present invention is not limited thereto.

In other words, for example, in the output control system 1, the AV amplifier 22 may supply the encoded audio data from the television set 21 via the TMDS channel line to the audio amplifiers $23_1$ and $23_2$ directly without the decoding.

In this case, the audio amplifiers $23_1$ and $23_2$ may be provided with decoding units for decoding the encoded audio data. Each of the audio amplifiers $23_1$ and $23_2$ decodes the encoded audio data from the AV amplifier 22 and outputs the to-be-output audio data from the obtained 22.2-channel audio data.

Figure 14:
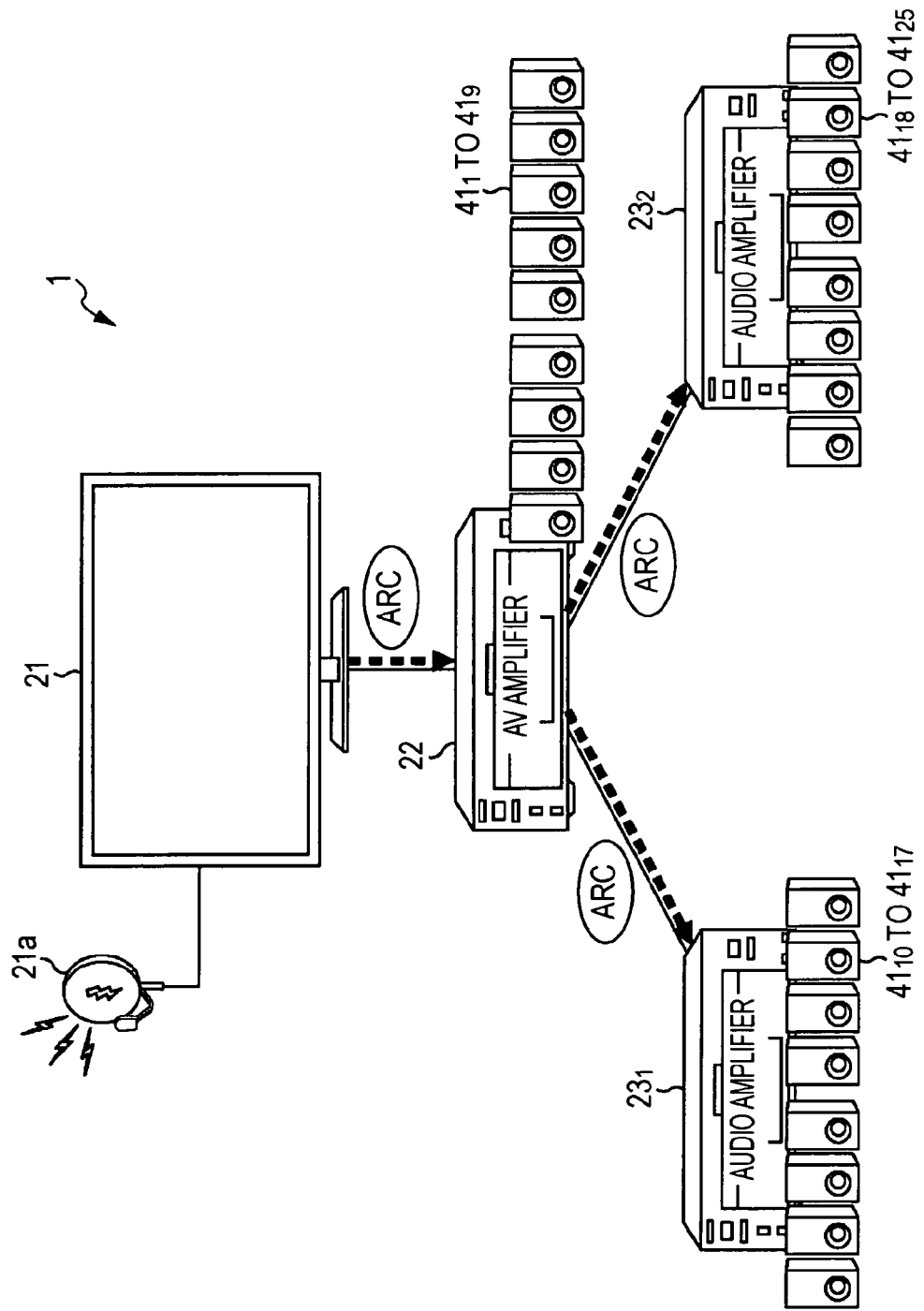
FIG. 14 is a diagram illustrating an example of communication performed by an output control system.

In addition, for example, in the output control system 1, as illustrated in FIG. 14, the AV amplifier 22 may be configured so that the input and output of the connection of the HDMI cable connected to the audio amplifiers $23_1$ and $23_2$ are reverted. Accordingly, the encoded audio data from the television set 21 may be supplied via the ARC line to the audio amplifiers $23_1$ and $23_2$ directly without the decoding thereof. In addition, in FIG. 14, the AV amplifier 22, the audio amplifier $23_1$, and the audio amplifier $23_2$ are configured to have the HDMI terminals that may be able to be connected by reversing the input and output of the connection of the HDMI cable.

In this case, similarly, the audio amplifiers $23_1$ and $23_2$ may be provided with decoding units for decoding the encoded audio data. Each of the audio amplifiers $23_1$ and $23_2$ decodes the encoded audio data supplied via the ARC line from the AV amplifier 22 and outputs the to-be-output audio data from the obtained 22.2-channel audio data.

In the embodiment, the AV amplifier 22 is configured to perform the processes such as decoding on the encoded audio data supplied via the ARC line from the television set 21. However, the present invention is not limited thereto.

Figure 15:
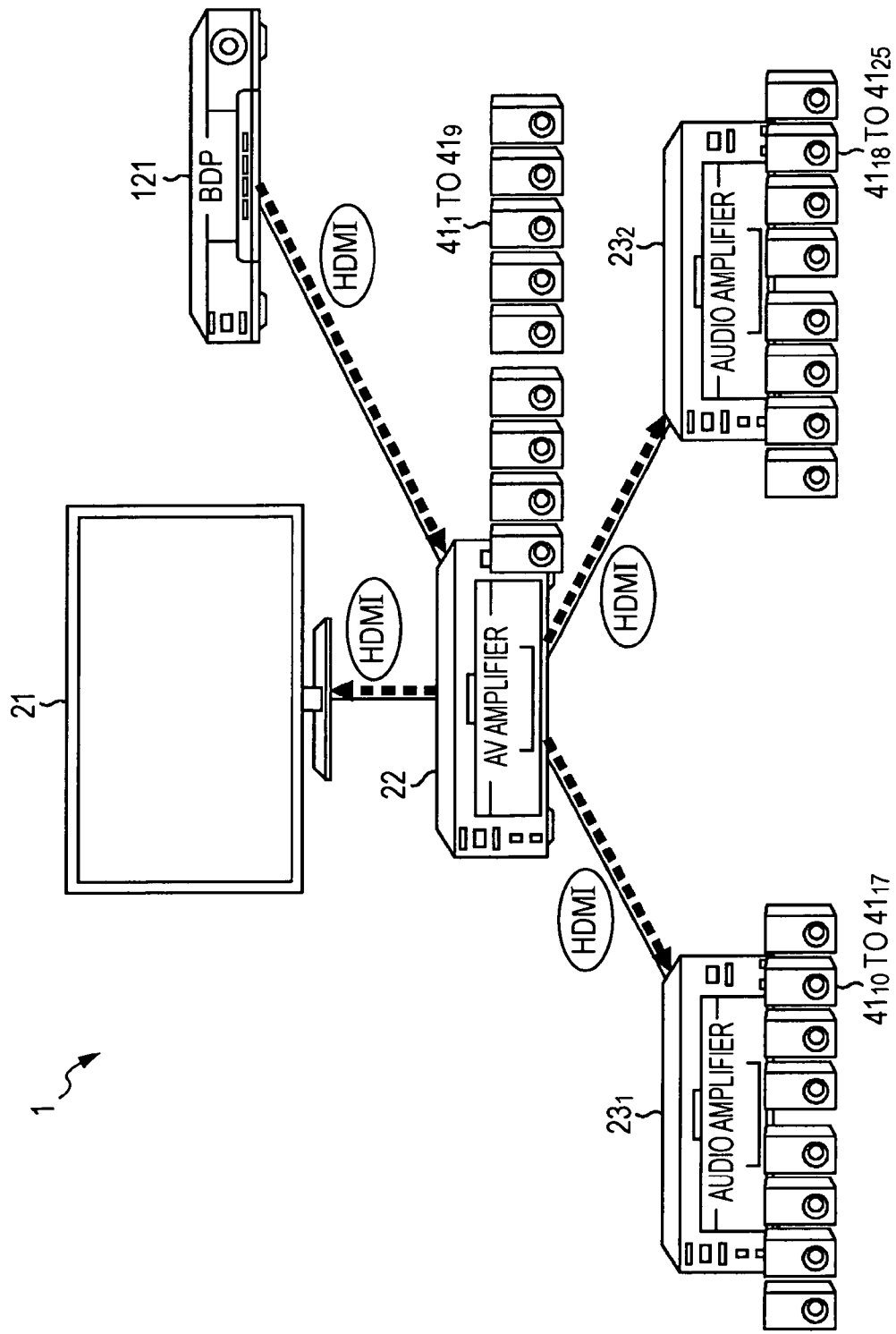
FIG. 15 is a diagram illustrating another example of communication performed by an output control system.

In other words, for example, as illustrated in FIG. 15, in the case where the AV amplifier 22 is connected to a BD player 121 through the HDMI cable, the AV amplifier 22 may perform the processes such as decoding on the encoded audio data supplied via the TMDS channel line from the BD player 121.

Figure 16:
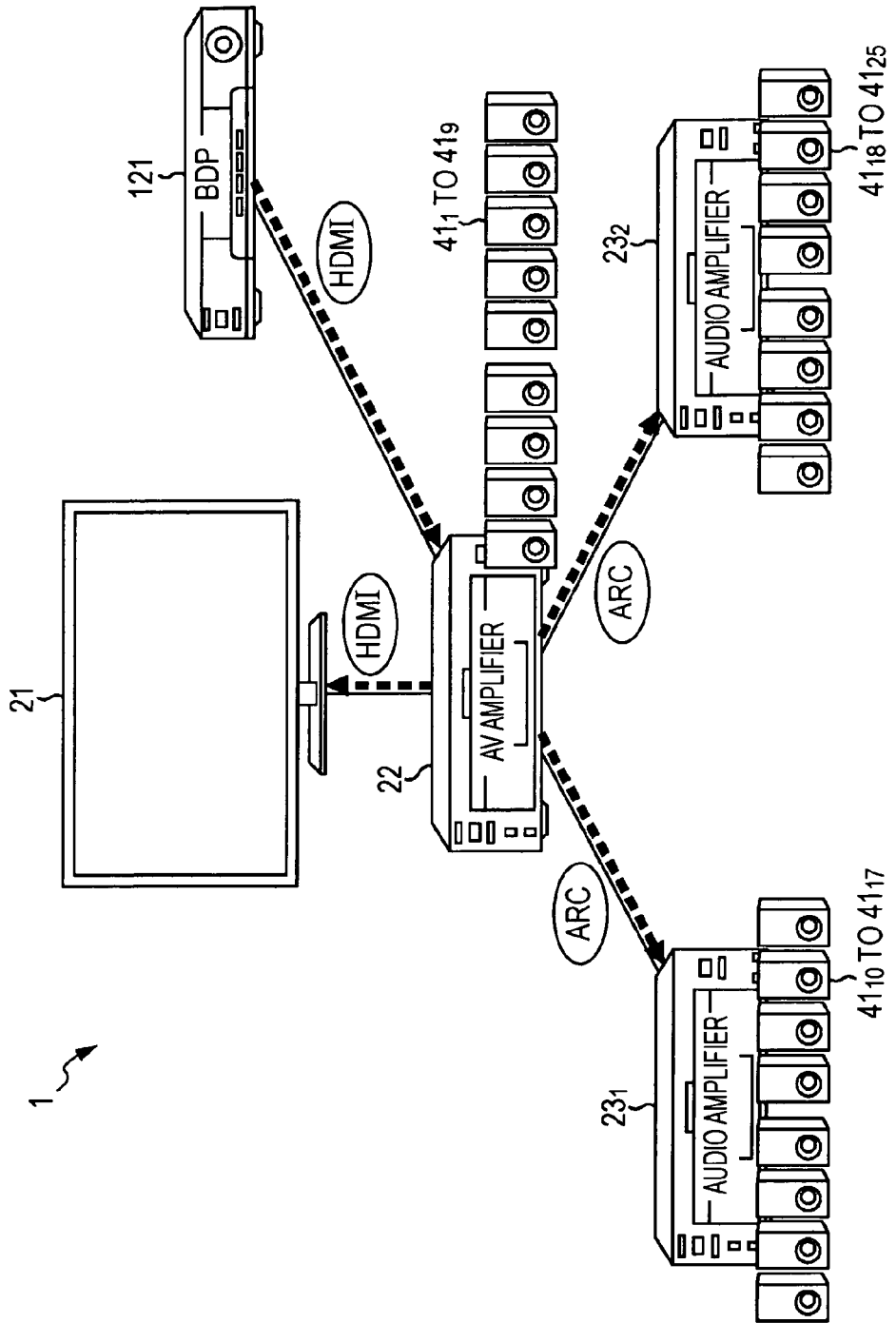
FIG. 16 is a diagram illustrating still another example of communication performed by an output control system.

In addition, for example, in the output control system 1, as illustrated in FIG. 16, in the case where the AV amplifier 22 is connected to the BD player 121 through the HDMI cable in the configuration of FIG. 14, the AV amplifier 22 may supplies the encoded audio data from the BD player 121 via the ARC line to the audio amplifiers $23_1$ and $23_2$.

In addition, in FIG. 16, in the output control system 1, instead of the configuration where the AV amplifier 22 is connected to the BD player 121, for example, the audio amplifier $23_1$ among the audio amplifier $23_1$ and the audio amplifier $23_2$ may be connected to the BD player 121.

In this case, the audio amplifier $23_1$ may have to include the HDMI terminal (the HDMI terminal through which the encoded audio data are supplied from the BD player 121 via the TMDS channel line) for connection of the BD player 121, for example, the HDMI terminal 69 of the AV amplifier 22 as well as the HDMI terminal 80 connected through the HDMI cable to the AV amplifier 22.

In the case where the audio amplifier $23_1$ is connected to the BD player 121, the BD player 121 supplies the encoded audio data through the audio amplifier $23_1$ to the AV amplifier 22, so that the same processes as those of the case where the AV amplifier 22 is directly connected to the BD player 121 may be performed.

In other words, for example, in the output control system 1 of FIG. 16, in the case where the audio amplifier $23_1$ instead of the AV amplifier 22 is connected to the BD player 121, the audio amplifier $23_1$ acquires the encoded audio data via the TMDS channel line from the BD player 121 and supplies the acquired encoded audio data via the TMDS channel line to the AV amplifier 22.

In the embodiment, the AV amplifier 22 is configured to be connected to the two audio amplifiers 23. However, the present invention is not limited thereto.

In other words, for example, in the case where each of the audio amplifiers 23 outputs only the 3-channel audio data, the AV amplifier 22 may be configured to be connected to five audio amplifiers 23. Therefore, the AV amplifier 22 outputs the audio data corresponding to the 9 channels (8.1 channels), and each of the five audio amplifiers 23 output the 3-channel audio data.

In addition, in the embodiment, a two-layered structure is configured so that the AV amplifier 22 is directly connected to two audio amplifiers 23. However, for example, a three-layered structure may be configured so that the AV amplifier 22 is connected to the audio amplifier $23_1$ and is connected through the audio amplifier $23_1$ to the audio amplifier $23_2$.

In addition, the AV amplifier 22 is configured to output the 8.1-channel audio data among the 22.2-channel audio data. However, for example, the AV amplifier 22 may be configured not to output the audio data but to divide the 22.2-channel audio data and supply the divided audio data to the connected audio amplifiers 23.

In this case, for example, the AV amplifier 22 is connected to a different audio amplifier $23_3$ outputting the 8.1-channel audio data as well as to the audio amplifiers $23_1$ and $23_2$.

In the embodiment, for example, in FIG. 1, the AV amplifier 22 is configured to be connected to the television set 21 supplying the encoded audio data through the HDMI cable. However, the present invention is not limited thereto.

In other words, for example, if the AV amplifier 22 is able to receive the encoded audio data from the television set 21, the AV amplifier 22 may be connected to the television set 21 through, for example, an optical cable or the like capable of communicating a large amount of data as well as the HDMI cable and may be connected in a wireless manner.

In addition, in the embodiment, the television set and the AV amplifier 22 are separately configured. However, for example, the television set 21 and the AV amplifier 22 may be integrally configured.

In this case, the AV amplifier 22 is not configured to indirectly receive the encoded audio data through the television set 21 but to directly receive the encoded audio data included in the broadcasted digital broadcasting signal.

In addition, in the embodiment, in the output control system 1, the AV amplifier 22, the audio amplifier $23_1$, and the audio amplifier $23_2$ are employed as a plurality of the output control apparatuses for outputting the 22.2-channel audio data. However, for example, only the audio amplifiers may be employed as a plurality of the output control apparatuses.

In other words, any apparatus that controls the output of the audio data may also be used as a plurality of the output control apparatuses.

In addition, hereinbefore, the number of channels for the audio data is set to 22.2 channels (24 channels). Any plural number may be the number of the channels for the audio data. The number of channels is not limited to the 22.2 channels.

A series of the aforementioned processes may be performed by dedicated hardware or by software. In the case where a series of the processes is performed by software, a program constituting the software is installed from a recording medium to a so-called embedded type computer or, for example, a general-purpose personal computer or the like in which various functions may be able to be performed by installing various types of programs.

Example of Configuration of Computer

Next, FIG. 17 illustrates an example of a configuration of a computer which performs a series of the aforementioned processes through a program.

A CPU (central processing unit) 201 executes various processes according to the program stored in a ROM (read only memory) 202 or a storage unit 208. The program executed by the CPU 201, data, or the like are appropriately stored in a RAM (random access memory) 203. The CPU 201, the ROM 202, and the RAM 203 are connected to each other via a bus 204.

The CPU 201 is also connected via the bus 204 to an input/output interface 205. The input/output interface 205 is connected to an input unit 206 constructed with a keyboard, a mouse, a microphone, or the like and an output unit 207 constructed with a display, a speaker, or the like. The CPU 201 executes various processes corresponding to commands input from the input unit 206. Next, the CPU 201 outputs the results of the processes to the output unit 207.

The storage unit 208 connected to the input/output interface 205 is constructed with, for example, a hard disk to store the program executed by the CPU 201 or the various data. A communication unit 209 is configured to communicate with an external apparatus through a network such as the Internet or a local area network.

In addition, the program may be acquired through the communication unit 209 and may be stored in the storage unit 208.

When a magnetic disc, an optical disc, a magneto-optical disc, or a removable media 211 such as a semiconductor memory is mounted, a drive 210 connected to the input/output interface 205 drives the discs or the like to acquire programs, data, or the like recorded therein. The acquired programs or data are transmitted to the storage unit 208 to be stored therein if necessary.

The recording medium for recording (storing) programs to be installed in a computer and to be executed by the computer is constructed with a magnetic disc (including a flexible disc), an optical disc (including a CD-ROM (including compact disc-read only memory) and a DVD (digital versatile disc)), a magneto-optical disc (including an MD (mini-disc)), a removable media 211 which is a packaged media of a semiconductor memory or the like, a ROM 202 temporarily or permanently storing programs, a hard disk constituting the storage unit 208, or the like as illustrated in FIG. 17. The recording of the programs on the recording medium is performed through the communication unit 209, which is an interface such as a router or a modem, by using a wired or wireless communication medium such as a local area network, the Internet, or the digital satellite broadcasting if necessary.

In addition, in the specification of the invention, the steps describing a series of the aforementioned processes includes processes performed in a time sequence according to the described order and processes performed in parallel or individually instead of being performed in a time sequence.

In addition, in the specification of the invention, the term "system" denotes the entire apparatus configured with a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An output control apparatus connectable to an audio output apparatus controlling output of audio data, comprising:
   a receiving device for receiving encoded data obtained by encoding multi-channel audio data;
   a decoding device for decoding the encoded data;
   an output control device for controlling output of a predetermined number of channels of audio data among the multi-channel audio data obtained by the decoding;
   a transmitting device for transmitting any one of audio data different from the audio data of which the output is controlled by the output control device among the multi-channel audio data obtained by the decoding and the encoded data to an audio output apparatus connected through an integrated cable formed by integrating at least a video line, an audio line, and a control line;
   a control device for controlling the audio output apparatus through the integrated cable, wherein the control device controls the audio output apparatus to adjust a sound volume of a sound corresponding to the audio data output by the audio output apparatus; and
   a calculating device for calculating an offset value obtained by subtracting a strength of a sound output from the output control device from a strength of a sound output from the audio output apparatus,
   wherein the control device adjusts the sound volume of the sound corresponding to the audio data output by the audio output apparatus based on the offset value.

2. The output control apparatus according to claim 1, wherein the control device further performs controlling so that the audio data output in the output control device and the audio data output in the audio output apparatus are output at the same timing.

3. The output control apparatus according to claim 2, further comprising:
   an acquiring device for acquiring an EDID (extended display identification data) of the audio output apparatus;
   a storage device for storing an EDID of the output control apparatus;
   a generating device for generating an EDID of an output control system, which is constructed with the output control apparatus and the audio output apparatus, based on the EDID of the output control apparatus and the EDID of the audio output apparatus.

4. The output control apparatus according to claim 3, wherein the control device controls the audio output apparatus to set audio data output from a plurality of output units included in the audio output apparatus.

5. The output control apparatus according to claim 3, wherein the EDID includes at least one of a latency indicating a time taken from the time when the audio data are received to the time when the audio data are output, the number of channels capable of outputting the audio data, and a decodable encoding method.

6. The output control apparatus according to claim 1, wherein the receiving device receives the encoded data through a second integrated cable.

7. The output control apparatus according to claim 1,
   wherein the integrated cable is an HDMI (high definition multimedia interface) cable, and
   wherein the control device controls the audio output apparatus via a CEC (consumer electronics control) line of the HDMI cable.

8. The output control apparatus according to claim 1, wherein the output control device controls a plurality of output units, which output sounds corresponding to the audio data, to output the corresponding sounds.

9. An output control apparatus connectable to an audio output apparatus controlling output of audio data, comprising:
   a receiving device for receiving encoded data obtained by encoding multi-channel audio data;
   a decoding device for decoding the encoded data;
   an output control device for controlling output of a predetermined number of channels of audio data among the multi-channel audio data obtained by the decoding;
   a transmitting device for transmitting any one of audio data different from the audio data of which the output is controlled by the output control device among the multi-channel audio data obtained by the decoding and the encoded data to an audio output apparatus connected through an integrated cable formed by integrating at least a video line, an audio line, and a control line; and
   a control device for controlling the audio output apparatus through the integrated cable,
   wherein the integrated cable is an HDMI (high definition multimedia interface) cable,
   wherein the control device controls the audio output apparatus via a CEC (consumer electronics control) line of the HDMI cable, and
   wherein the transmitting device transmits data different from the data of which the output is controlled by the output control device among after-decoding multi-channel data via a TMDS (transition minimized differential signaling) channel line of the HDMI cable to the audio output apparatus.

10. An output controlling method of an output control apparatus connected to an audio output apparatus controlling output of audio data,
   wherein the output control apparatus comprises:
   a receiving device;
   a decoding device;
   an output control device;

a transmitting device;
a control device; and
a calculating device,
wherein the output controlling method comprises the steps of:
in the receiving device, receiving encoded data obtained by encoding multi-channel audio data;
in the decoding device, decoding the encoded data;
in the output control device, controlling output of a predetermined number of channels of audio data among the multi-channel audio data obtained by the decoding;
in the transmitting device, transmitting any one of audio data different from the audio data of which the output is controlled by the output control device among the multi-channel audio data obtained by the decoding and the encoded data to an audio output apparatus connected through an integrated cable formed by integrating at least a video line, an audio line, and a control line;
in the control device, controlling the audio output apparatus through the integrated cable; and
in the calculating device, calculating an offset value obtained by subtracting a strength of a sound output from the output control device from a strength of a sound output from the audio output apparatus,
wherein in the control device, adjusting the sound volume of the sound corresponding to the audio data output by the audio output apparatus based on the offset value.

11. A non-transitory computer readable medium having stored thereon a program that when executed by a computer of an output control apparatus connected to an audio output apparatus controlling output of audio data performs a method, said method comprising:
in a receiving device, receiving encoded data obtained by encoding multi-channel audio data;
in a decoding device, decoding the encoded data;
in an output control device, controlling output of a predetermined number of channels of audio data among the multi-channel audio data obtained by the decoding;
in a transmitting device, transmitting any one of audio data different from the audio data of which the output is controlled by the output control device among the multi-channel audio data obtained by the decoding and the encoded data to an audio output apparatus connected through an integrated cable formed by integrating at least a video line, an audio line, and a control line;
in a control device, controlling the audio output apparatus through the integrated cable; and
in a calculating device, calculating an offset value obtained by subtracting a strength of a sound output from the output control device from a strength of a sound output from the audio output apparatus,
wherein in the control device, adjusting the sound volume of the sound corresponding to the audio data output by the audio output apparatus based on the offset value.

12. An output control system having a master apparatus receiving encoded data obtained by encoding multi-channel data and a slave apparatus connected to the master apparatus,
wherein the master apparatus comprises:
a first receiving device to receive the encoded data obtained by encoding the multi-channel audio data;
a decoding device to decode the encoded data;
a first output controller devices control output of a predetermined number of channels of audio data among the multi-channel audio data obtained by the decoding;
a transmitting device to transmit any one of audio data different from the audio data of which the output is controlled by the first output controller device among the multi-channel audio data obtained by the decoding and the encoded data to the slave apparatus connected through an integrated cable formed by integrating at least a video line, an audio line, and a control line;
a controller device to control the slave apparatus through the integrated cable; and
a calculating device to calculate an offset value obtained by subtracting a strength of a sound output from the first output controller device from a strength of a sound output from the master apparatus,
wherein the controller device adjusts the sound volume of the sound corresponding to the audio data output by the master apparatus based on the offset value,
wherein the slave apparatus comprises:
a second receiving device to receive the audio data from the transmitting device;
a second output controller device to control output of the received audio data; and
an executing device to execute a predetermined process according to the control of the controller device.

* * * * *